(12) United States Patent
Sullivan et al.

(10) Patent No.: US 8,954,188 B2
(45) Date of Patent: Feb. 10, 2015

(54) STORAGE AND RETRIEVAL SYSTEM CASE UNIT DETECTION

(75) Inventors: Robert Sullivan, Wilmington, MA (US); Stephen C. Toebes, Sunderland, MA (US)

(73) Assignee: Symbotic, LLC, Wilmington, MA (US)

( * ) Notice: Subject to any disclaimer, the term of this patent is extended or adjusted under 35 U.S.C. 154(b) by 58 days.

(21) Appl. No.: 13/608,877

(22) Filed: Sep. 10, 2012

(65) Prior Publication Data

US 2013/0245810 A1    Sep. 19, 2013

Related U.S. Application Data

(60) Provisional application No. 61/533,048, filed on Sep. 9, 2011.

(51) Int. Cl.
*G06F 7/00* (2006.01)
*B65G 1/137* (2006.01)
*G06Q 10/08* (2012.01)

(52) U.S. Cl.
CPC .............. *B65G 1/1371* (2013.01); *G06Q 10/08* (2013.01)
USPC .......................................... 700/214; 414/273

(58) Field of Classification Search
USPC ....................................................... 700/214
See application file for complete search history.

(56) References Cited

U.S. PATENT DOCUMENTS

| | | | |
|---|---|---|---|
| 1,146,283 A | 7/1915 | Rush | |
| 2,497,887 A | 2/1950 | Meler | |
| 3,745,726 A | 7/1973 | Thom | |
| 4,319,689 A * | 3/1982 | Clapp | 211/182 |
| 5,574,226 A | 11/1996 | Reuther et al. | |
| 5,611,181 A | 3/1997 | Shreiner | |
| 5,644,879 A | 7/1997 | Schre | |

(Continued)

FOREIGN PATENT DOCUMENTS

| | | |
|---|---|---|
| CN | 102317945 | 1/2012 |
| JP | 2000302214 | 10/2000 |

(Continued)

OTHER PUBLICATIONS

International Search Report dated Mar. 14, 2013.

(Continued)

*Primary Examiner* — Gene Crawford
*Assistant Examiner* — Kyle Logan
(74) *Attorney, Agent, or Firm* — Perman & Green, LLP

(57) ABSTRACT

An automated storage and retrieval system including a storage structure with storage racks having a seating surface configured to support case units where a position of each case unit is non-deterministic for each storage location on the storage racks, each case unit has a predetermined storage position and a controller is configured to determine the predetermined storage position, a picking aisle configured to provide access to the case units within the storage structure, and a seismic disturbance restorative system including seismic disturbance motions sensors disposed on the storage racks, a seismic disturbance control module in communication with the seismic disturbance sensors and configured to identify a seismic disturbance, and an automated case mapper configured to traverse the picking aisle, the automated case mapper being in communication with and initialized by the seismic disturbance control module to identify a seated position of at least one case unit within the storage structure.

21 Claims, 24 Drawing Sheets

(56) References Cited

U.S. PATENT DOCUMENTS

| | | |
|---|---|---|
| 5,713,162 A | 2/1998 | Gallo et al. |
| 5,861,557 A | 1/1999 | Sahs |
| 6,042,321 A | 3/2000 | Labell |
| 6,115,973 A | 9/2000 | Goto |
| 6,564,516 B1 | 5/2003 | Svensson |
| 6,571,717 B2 | 6/2003 | Svensson |
| 6,672,573 B2 | 1/2004 | Berton |
| 6,864,315 B1 | 3/2005 | Hakuta et al. |
| 6,912,751 B2 | 7/2005 | Steiger |
| 7,051,808 B1 | 5/2006 | Vinegar et al. |
| 7,204,669 B2 | 4/2007 | Cho et al. |
| 7,252,454 B2 | 8/2007 | Bradford et al. |
| 7,395,570 B2 | 7/2008 | Bradford et al. |
| 8,015,760 B2 | 9/2011 | Kemeny |
| 2001/0054785 A1 | 12/2001 | Berton |
| 2002/0073787 A1 | 6/2002 | Eigen et al. |
| 2003/0079877 A1 | 5/2003 | Wellington et al. |
| 2003/0080604 A1 | 5/2003 | Vinegar et al. |
| 2003/0098149 A1 | 5/2003 | Wellington et al. |
| 2003/0098605 A1 | 5/2003 | Vinegar et al. |
| 2003/0100451 A1 | 5/2003 | Messier et al. |
| 2003/0102124 A1 | 6/2003 | Vinegar et al. |
| 2003/0102125 A1 | 6/2003 | Wellington et al. |
| 2003/0102126 A1 | 6/2003 | Sumnu-Dindoruk et al. |
| 2003/0102130 A1 | 6/2003 | Vinegar et al. |
| 2003/0111223 A1 | 6/2003 | Rouffignac et al. |
| 2003/0116315 A1 | 6/2003 | Wellington et al. |
| 2003/0130136 A1 | 7/2003 | Rouffignac et al. |
| 2003/0131993 A1 | 7/2003 | Zhang et al. |
| 2003/0131994 A1 | 7/2003 | Vinegar et al. |
| 2003/0131995 A1 | 7/2003 | de Rouffignac et al. |
| 2003/0131996 A1 | 7/2003 | Vinegar et al. |
| 2003/0136558 A1 | 7/2003 | Wellington et al. |
| 2003/0136559 A1 | 7/2003 | Wellington et al. |
| 2003/0137181 A1 | 7/2003 | Wellington et al. |
| 2003/0141067 A1 | 7/2003 | Rouffignac et al. |
| 2003/0141068 A1 | 7/2003 | Pierre de Rouffignac et al. |
| 2003/0142964 A1 | 7/2003 | Wellington et al. |
| 2003/0146002 A1 | 8/2003 | Vinegar et al. |
| 2003/0148894 A1 | 8/2003 | Vinegar et al. |
| 2003/0155111 A1 | 8/2003 | Vinegar et al. |
| 2003/0164239 A1 | 9/2003 | Wellington et al. |
| 2003/0173072 A1 | 9/2003 | Vinegar et al. |
| 2003/0173078 A1 | 9/2003 | Wellington et al. |
| 2003/0173080 A1 | 9/2003 | Berchenko et al. |
| 2003/0173081 A1 | 9/2003 | Vinegar et al. |
| 2003/0173082 A1 | 9/2003 | Vinegar et al. |
| 2003/0173085 A1 | 9/2003 | Vinegar et al. |
| 2003/0178191 A1 | 9/2003 | Maher et al. |
| 2003/0183390 A1 | 10/2003 | Veemstra et al. |
| 2003/0192691 A1 | 10/2003 | Vinegar et al. |
| 2003/0192693 A1 | 10/2003 | Wellington |
| 2003/0196788 A1 | 10/2003 | Vinegar et al. |
| 2003/0196789 A1 | 10/2003 | Wellington et al. |
| 2003/0196801 A1 | 10/2003 | Vinegar et al. |
| 2003/0196810 A1 | 10/2003 | Vinegar et al. |
| 2003/0201098 A1 | 10/2003 | Karanikas et al. |
| 2003/0205378 A1 | 11/2003 | Wellington et al. |
| 2003/0209348 A1 | 11/2003 | Ward et al. |
| 2004/0016065 A1 | 1/2004 | Steiger et al. |
| 2004/0020642 A1 | 2/2004 | Vinegar et al. |
| 2004/0024720 A1 | 2/2004 | Fairweather |
| 2004/0040715 A1 | 3/2004 | Wellington et al. |
| 2004/0074205 A1 | 4/2004 | Stache |
| 2004/0143602 A1 | 7/2004 | Ruiz et al. |
| 2004/0255535 A1 | 12/2004 | Herren |
| 2005/0063089 A1* | 3/2005 | Starr et al. ...................... 360/92 |
| 2005/0244228 A1 | 11/2005 | Bradford et al. |
| 2005/0262650 A1 | 12/2005 | Bradford et al. |
| 2006/0158043 A1 | 7/2006 | Brouwer et al. |
| 2007/0043600 A1* | 2/2007 | Solomon ........................... 705/7 |
| 2007/0220815 A1 | 9/2007 | Kemeny |
| 2008/0288104 A1 | 11/2008 | Shani |
| 2009/0234500 A1* | 9/2009 | Tanaka ........................ 700/250 |
| 2010/0126727 A1 | 5/2010 | Vinegar et al. |
| 2010/0208860 A1 | 8/2010 | Petrovich |
| 2010/0217565 A1 | 8/2010 | Wayne et al. |
| 2010/0281807 A1 | 11/2010 | Bradford |
| 2010/0316469 A1* | 12/2010 | Lert et al. ..................... 414/273 |
| 2011/0060449 A1 | 3/2011 | Wurman et al. |
| 2012/0041130 A1 | 2/2012 | Ye |
| 2012/0189411 A1 | 7/2012 | Yoshinaga |

FOREIGN PATENT DOCUMENTS

| | | |
|---|---|---|
| JP | 2000344313 | 12/2000 |
| JP | 2004010294 | 1/2004 |
| JP | 2008290807 | 4/2008 |
| KR | 639477 | 10/2006 |
| KR | 791182 B1 | 1/2008 |
| WO | 9951455 | 10/1999 |
| WO | 03/013932 | 2/2003 |

OTHER PUBLICATIONS

Patent Cooperation Treaty, Notification of Transmittal of the International Search Report and The Written Opinion of the International Searching Authority, or The Declaration. Sep. 10, 2012.

* cited by examiner

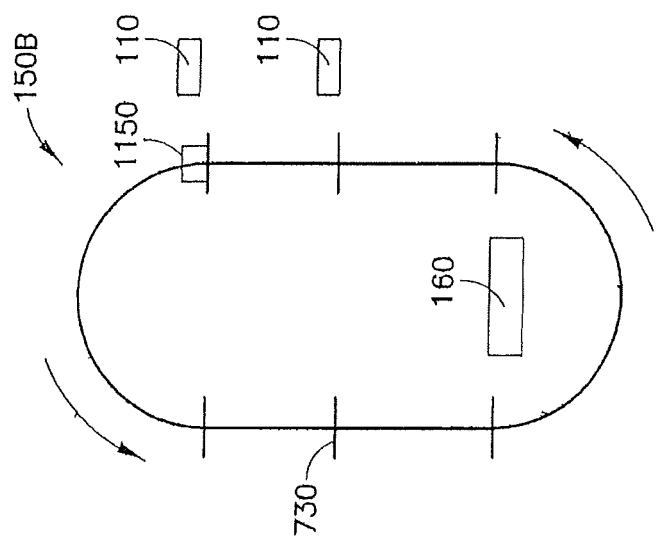
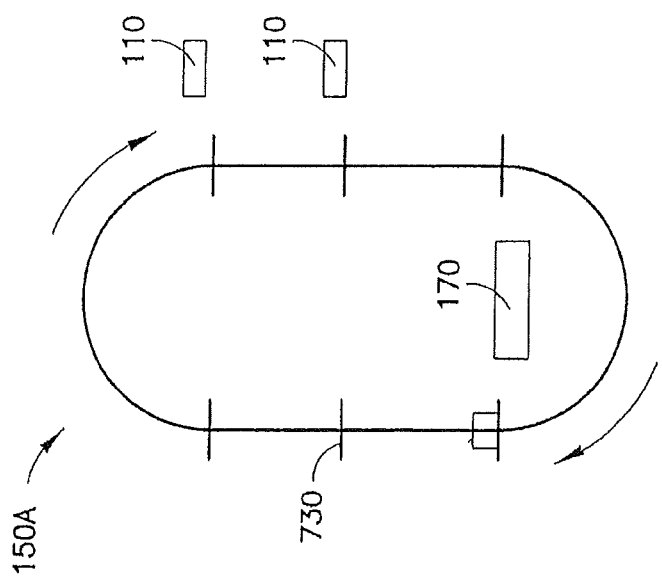

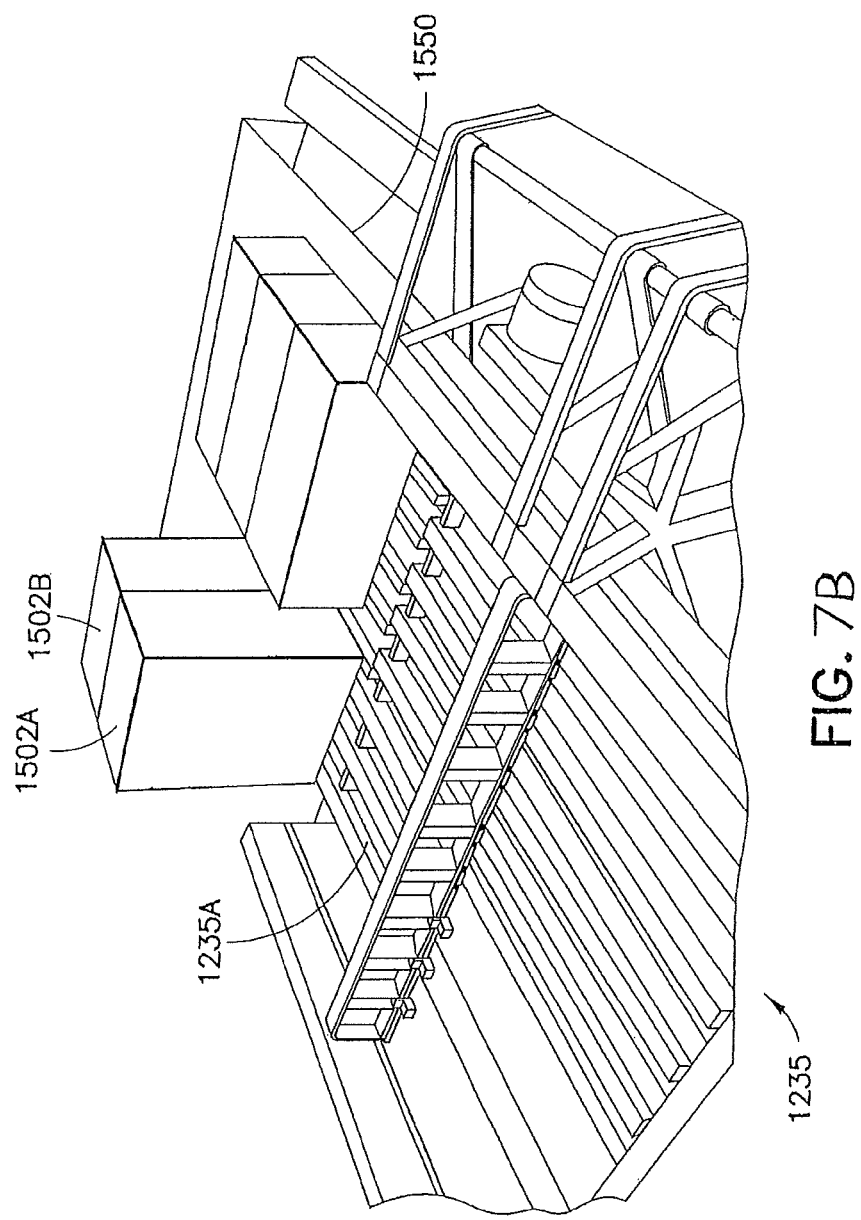

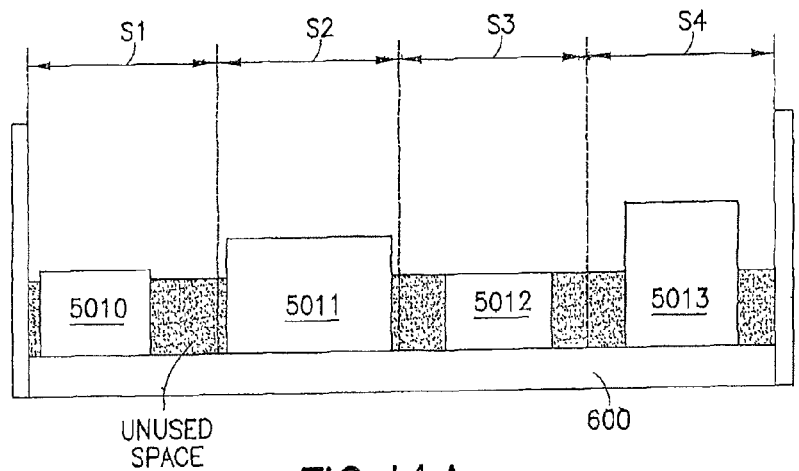
FIG. 14A
PRIOR ART
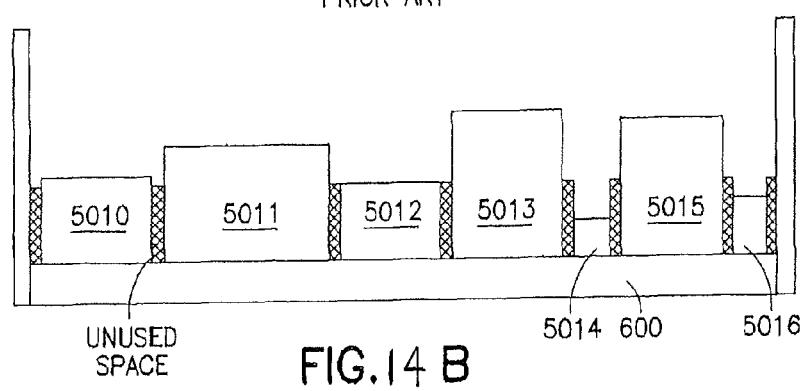
FIG. 14B
UNUSED STORAGE SPACE (DYNAMIC ALLOCATION) =
UNUSED STORAGE SPACE (STORAGE SLOTS) =
FIG. 14C

STORAGE AND RETRIEVAL SYSTEM CASE UNIT DETECTION

CROSS-REFERENCE TO RELATED APPLICATIONS

This application is a non-provisional of and claims the benefit of U.S. provisional patent application 61/533,048 filed on Sep. 9, 2011, the disclosure of which is incorporated by reference herein in its entirety.

BACKGROUND

1. Field

The exemplary embodiments generally relate to material handling systems and, more particularly, to automated storage and retrieval systems.

2. Brief Description of Related Developments

Warehouses for storing case units may generally comprise a series of storage racks that are accessible by transport devices such as, for example, fork lifts, carts and elevators that are movable within aisles between or along the storage racks or by other lifting and transporting devices. These transport devices may be automated or manually driven.

BRIEF DESCRIPTION OF THE DRAWINGS

The foregoing aspects and other features of the aspects of the disclosed embodiment is explained in the following description, taken in connection with the accompanying drawings, wherein:

FIGS. 2A, 2B, 2C and 2D illustrate schematic views of a conveyor system in accordance with an aspect of the disclosed embodiment;

FIGS. 7A and 7B illustrate a portion of a transfer arm of the transport robot of FIG. 5 in accordance with an aspect of the disclosed embodiment;

FIG. 14A illustrates a conventional organization of item storage in a storage bay;

FIG. 14B illustrates an organization of case units in a storage bay in accordance with an aspect of the disclosed embodiment;

FIG. 14C illustrates a comparison of unused storage space between the item storage of FIG. 14A and the item storage of FIG. 14B;

DETAILED DESCRIPTION

Figure 1:
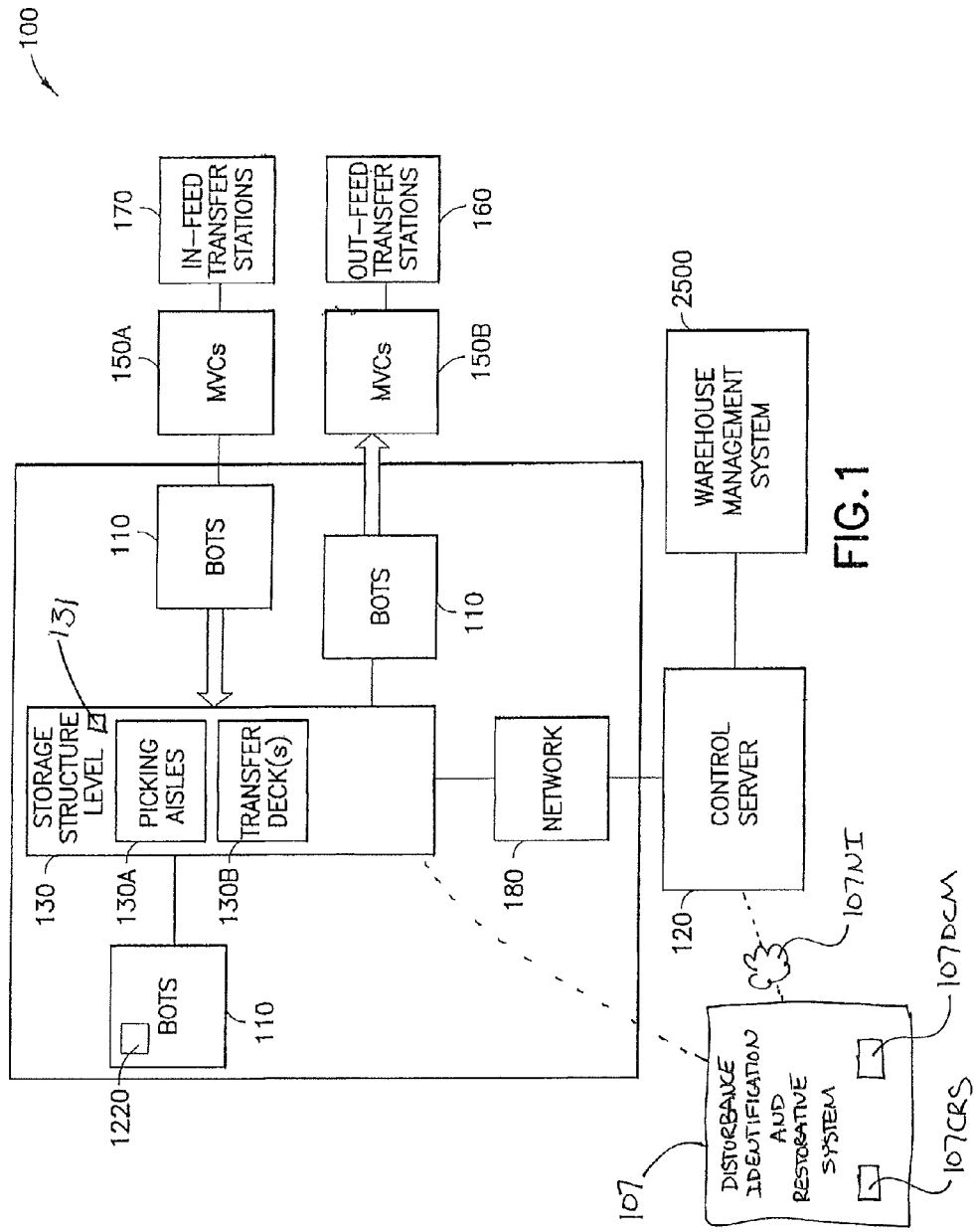
FIG. 1 schematically illustrates an exemplary storage and retrieval system in accordance with an aspect of the disclosed embodiment.

FIG. 1 generally schematically illustrates an automated storage and retrieval system 100 (referred to hereinafter as a "storage and retrieval system") for cases stored in a storage room in accordance with an aspect of the disclosed embodiment. Although the disclosed embodiment will be described with reference to the drawings, it should be understood that the aspects of the disclosed embodiment can be embodied in many alternate forms. In addition, any suitable size, shape or type of elements or materials could be used.

In the system shown, the automated storage and retrieval system 100 includes a disturbance identification and restorative system 107 (as will be described in greater detail below). The case units may be stored in the automated storage and retrieval system 100 on the storage racks where the storage racks are configured to allow (as will be described below) nondeterministic positioning or placement (e.g. dynamic placement) of case units everywhere along a seating surface of the storage racks in any suitable manner for providing unrestricted placement of each case unit in the storage racks. The nondeterministic positioning of the case units allows the case units (for example, stored individually or grouped together, which are referred to as pickfaces described further below) to have a close packed spacing within the storage racks that may result in a floating gap between storage locations of an amount equal to or less than about 3.0 in between pickfaces while in other aspects the floating gap may be equal to or less than about 1.0 in between pickfaces (cases within each pickface formed of more than one case may be touching without gaps). It is noted that the only forces holding the case units on the racks may be gravity, inertial and/or frictional forces. The case units may move relative to the storage rack (e.g. from a predetermined storage location—e.g. pre-disturbance location) during, for example, a disturbance such as a seismic event (e.g. an earthquake) or other event (e.g. collision) that otherwise imparts dynamic forces that cause movement of the storage racks which in turn may cause movement of the case units. Movement of the cases due to, for example, the movement of the storage racks may affect the ability of the case units to be retrieved and/or transported by the transport devices.

It would be advantageous to have a storage and retrieval system that is configured to detect displaced case units after a seismic or other event (e.g. an impact from a collision between a transport vehicle and storage structure) so that the displaced case units can be repositioned within the storage and retrieval system.

Generally, during a seismic event case unit movement may occur within the storage and retrieval system. The amount of case movement (or acceleration of the cases and/or an area of the storage racks at a location of a respective case) may be estimated during, for example a worst-case (or any other magnitude) seismic event in any suitable manner using, for example dynamic modeling of the storage structure and/or physical simulation (collectively referred to herein as movement models). Movement of the case units may be limited or substantially non-existent in some areas of the storage structure due to, for example, localized dynamic behavior while other areas of the storage structure may experience case movement.

In the event that case movement occurs due to, for example, a seismic event the cases will be scanned or mapped, as will be described below in greater detail, to identify, for example, cases that are located in the travel paths of the bots, cases that have substantially not moved and are still able to be picked by a bot (i.e. still useable by the bot), case units that have moved or shifted on the storage racks but are in a known state and are useable by the bot, and cases that have moved or otherwise shifted to an unknown state or substantially moved so that the cases cannot be picked by the bot in a useable manner.

In accordance with one aspect of the disclosed embodiment the storage and retrieval system 100 may operate in a retail distribution center such as a store or warehouse to, for example, fulfill orders received from retail stores for case units (where case units as used herein means case units not stored in trays, on totes or on pallets, e.g. uncontained). It is noted that the case units may include cases of case units (e.g. case of soup cans, boxes of cereal, etc.) or individual case units that are adapted to be taken off of or placed on a pallet. In accordance with the aspects of the disclosed embodiment, shipping cases or case units (e.g. cartons, barrels, boxes, crates, jugs, or any other suitable device for holding case units) may have variable sizes and may be used to hold case units in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different case units (e.g. each pallet may hold different types of case units—a pallet holds a combination of soup and cereal). In other aspects the storage and retrieval system described herein may be applied to any environment in which case units are stored and retrieved.

Figure 4:
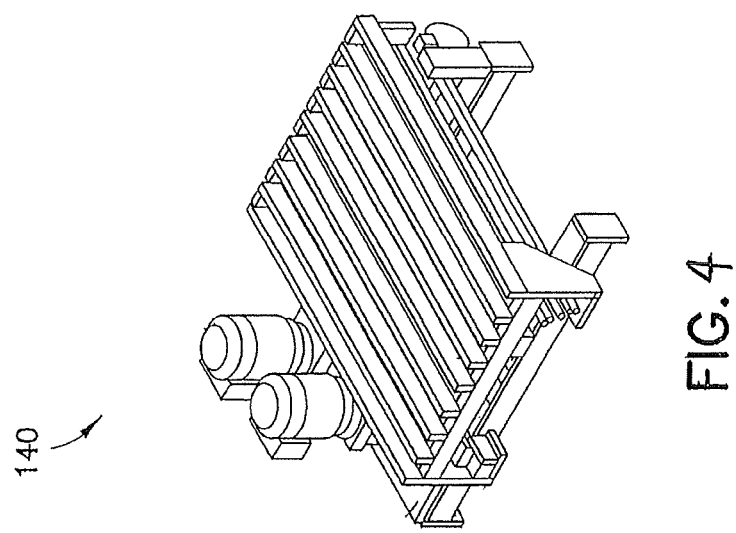
FIG. 4 schematically illustrate a transfer station in accordance with an aspect of the disclosed embodiment.

The storage and retrieval system 100 may be configured for installation in, for example, existing warehouse structures or adapted to new warehouse structures. In one aspect of the disclosed embodiment, the storage and retrieval system may include in-feed and out-feed transfer stations 170, 160, multilevel vertical conveyors 150A, 150B, a storage structure 130, and a number of autonomous vehicular transport robots 110 (referred to herein as "bots"). In other aspects the storage and retrieval system may also include robot or bot transfer stations 140 (FIG. 4) that may provide an interface between the bots 110 and the multilevel vertical conveyors 150A, 150B. The storage structure 130 may include multiple levels of storage rack modules where each level includes respective picking aisles 130A, and transfer decks 130B for transferring case units between any of the storage areas of the storage structure 130 and any shelf of any multilevel vertical conveyor 150A, 150B. The picking aisles 130A, and transfer decks 130B also allow the bots to place case units into picking stock and to retrieve ordered case units. In other aspects, each level may also include respective bot transfer stations 140. The bots 110 may be configured to place case units, such as the above described retail merchandise, into picking stock in the one or more levels of the storage structure 130 and then selectively retrieve ordered case units for shipping the ordered case units to, for example, a store or other suitable location. Bots 110 may place case units in sets of one or more cases called a pickface. The storage area or space of the storage structure has a substantially open architecture, as shown in the figures and as will be described further below. Uncontained case units may be placed as desired, in a substantially unconstrained manner, onto seating surfaces of the storage structure for storage. Though described herein with reference to uncontained cases, the case units may also be held on a tote or tray (holding a set of one or more cases) that is transported, picked and placed on the unconstrained, position undeterministic surface of the rack shelves as otherwise described. The in-feed transfer stations 170 and out-feed transfer stations 160 may operate together with their respective multilevel vertical conveyors 150A, 150B for bi-directionally transferring case units to and from one or more levels of the storage structure 130. It is noted that while the multilevel vertical conveyors are described as being dedicated inbound conveyors 150A and outbound conveyors 150B, in alternate embodiments each of the conveyors 150A, 150B may be used for both inbound and outbound transfer of case units/case units from the storage and retrieval system.

Figure 2A:
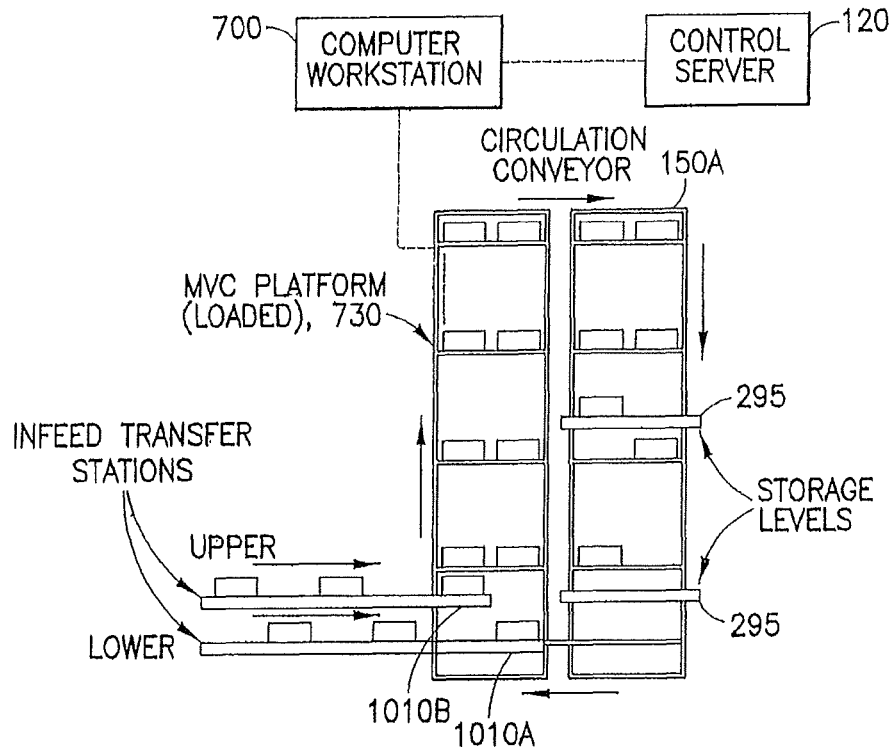
Figure 2B:
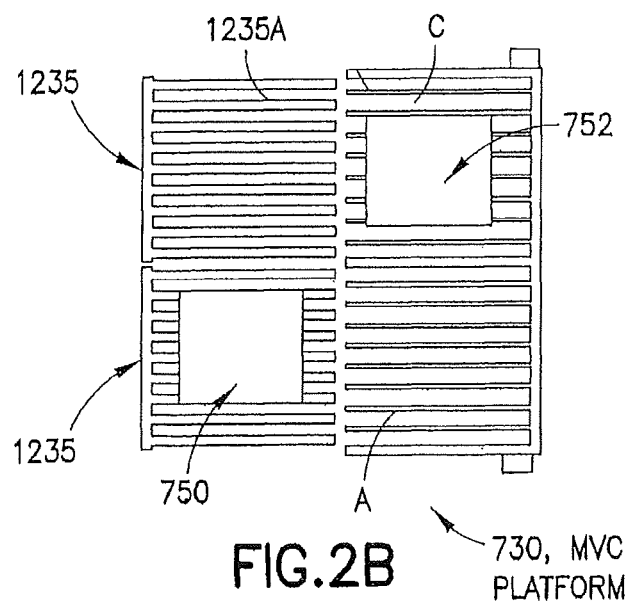

It is noted that the multilevel vertical conveyors may be substantially similar to those described in U.S. patent application Ser. No. 12/757,354, entitled "LIFT INTERFACE FOR STORAGE AND RETRIEVAL SYSTEMS," filed on Apr. 9, 2010, the disclosure of which is incorporated by reference herein in its entirety. For example, referring to FIGS. 2A-3, it is noted that the input multilevel vertical conveyor 150A and associated in-feed transfer stations 170 will be described, however, the out-feed multilevel vertical conveyors 150B and out-feed transfer stations 160 may be substantially similar to that described below for their in-feed counterparts but for the direction of material flow out of the storage and retrieval system 100 rather than into the storage and retrieval system 100. It is noted that while the multilevel vertical conveyors are described herein as a continuously moving vertical loop type conveyor in other aspects the multilevel vertical conveyors may stop to allow bots to drive on the multilevel vertical conveyor for transferring the bots between storage levels. In still other aspects the multilevel vertical conveyor may be a reciprocating type conveyor or elevator that is configured to either transport bots (which may be carrying case units) between storage levels and/or transport case units between storage levels where the case units are removed by the bots on a predetermined storage level. As may be realized, the storage and retrieval system 100 may include multiple in-feed and out-feed multilevel vertical conveyors 150A, 150B that are accessible by, for example, bots 110 on each level of the storage and retrieval system 100 so that one or more case unit(s), uncontained or without containment (e.g. case unit(s) are not sealed in trays), can be transferred from a multilevel vertical conveyor 150A, 150B to each storage space on a respective level and from each storage space to any one of the multilevel vertical conveyors 150A, 150B on a respective level. The bots 110 may be configured to transfer the uncontained case units between the storage spaces and the multilevel vertical conveyors with one pick (e.g. substantially directly between the storage spaces and the multilevel vertical conveyors). By way of further example, the designated bot 110 picks the uncontained case unit(s) from a shelf of a multilevel vertical conveyor, transports the uncontained case unit(s) to a predetermined storage area of the storage structure 130 and places the uncontained case unit(s) in the predetermined storage area (and vice versa).

The multilevel vertical conveyors 150A, 150B may be controlled by a server, such as for example, control server 120, or any other suitable controller. One or more suitable computer workstations 700 may be connected to the multilevel vertical conveyors 150A, 150B and the server 120 in any suitable manner (e.g. wired or wireless connection) for providing, as an example, inventory management, multilevel vertical conveyor functionality and control, and customer order fulfillment. As may be realized, the computer workstations 700 and/or server 120 may be programmed to control the in-feed and/or out-feed conveyor systems. In other aspects, the computer workstations 700 and/or server 120 may also be programmed to control the transfer stations 140. In one aspect of the disclosed embodiment, one or more of the workstations 700 and control server 120 may include a control cabinet, a programmable logic controller and variable frequency drives for driving the multilevel vertical conveyors 150A, 150B. In other aspects the workstations 700 and/or control server 120 may have any suitable components and configuration. In one aspect of the disclosed embodiment, the workstations 700 may be configured to substantially remedy any exceptions or faults in the in-feed and/or out-feed conveyor systems substantially without operator assistance and communicate fault recovery scenarios with the control server 120 and/or vice versa.

Figure 3:
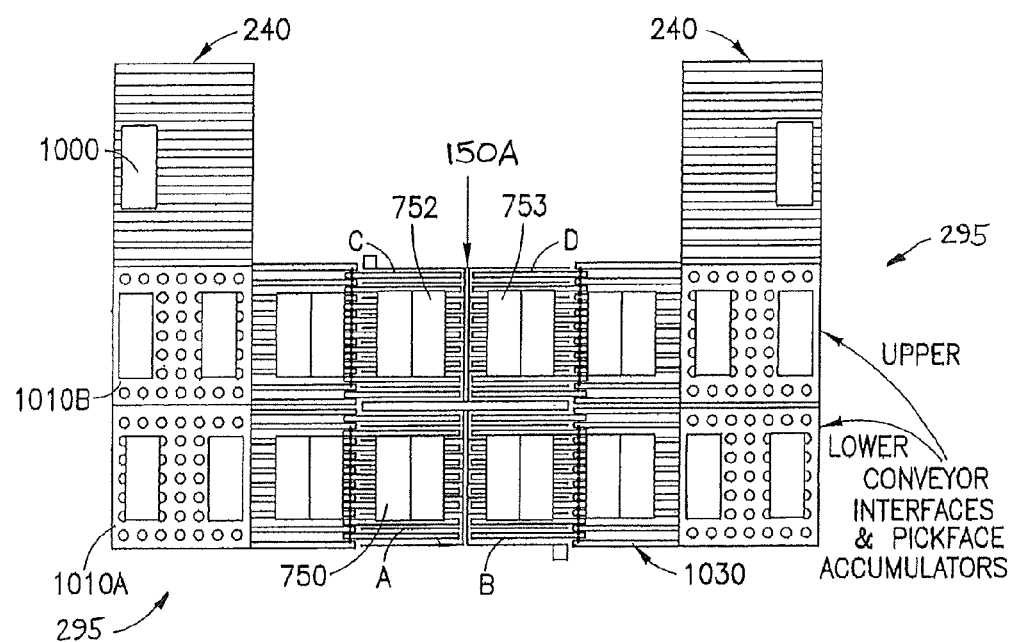
FIG. 3 schematically illustrates a conveyor system in accordance with an aspect of the disclosed embodiment.

Referring now to FIG. 3, above, the multilevel vertical conveyors, such as conveyor 150A are supplied with uncontained case units 1000 from in-feed transfer stations 170 (FIG. 1). As described above, the in-feed transfer stations 170 may include one or more of depalletizing workstations 210 (FIGS. 9 and 10), conveyors 240, conveyor interfaces/bot load accumulators 1010A, 1010B and conveyor mechanisms 1030. In this aspect of the disclosed embodiment, the accumulators 1010A, 1010B are configured to form the uncontained case units 1000 into the individual bot pickfaces 750-753 prior to loading a respective position A-D on the multilevel vertical conveyor 150A. It is noted that a "pickface" as used herein may be one or more merchandise case units placed one behind the other in a storage space or area of a storage shelf to be used in pick transactions for filling customer orders. In one aspect of the disclosed embodiment, the computer workstation 700 and/or control server 120 may provide instructions or suitably control the accumulators 1010A, 1010B (and/or other components of the in-feed transfer stations 170) for accumulating a predetermined number of case units to form the pickfaces 750-753. The accumulators 1010A, 1010B may align the case units in any suitable manner (e.g. making one or more sides of the case units flush, etc.) and, for example, abut the case units together. The accumulators 1010A, 1010B may be configured to transfer the pickfaces 750-753 to respective conveyor mechanisms 1030 for transferring the pickfaces 750-753 to a respective shelf position A-D.

The bots may be substantially similar to those described in U.S. patent application Ser. No. 12/757,312 entitled "AUTONOMOUS TRANSPORTS OR STORAGE AND RETRIEVAL SYSTEMS," filed on Apr. 9, 2010 the disclosure of which is incorporated by reference herein in its entirety. For example, referring now to FIGS. 5, 6, 7A and 7B, the bots 110 that transfer loads between, for example, the multilevel vertical conveyors 150A, 150B and the storage shelves of a respective level of storage structure 130 will be described. In one aspect, the bots 110 may be configured for substantially continuous operation. For exemplary purposes only, the bots 110 may have a duty cycle of about ninety-five (95) percent. In other aspects the bots may have any suitable duty cycle and operational periods.

Figure 5:
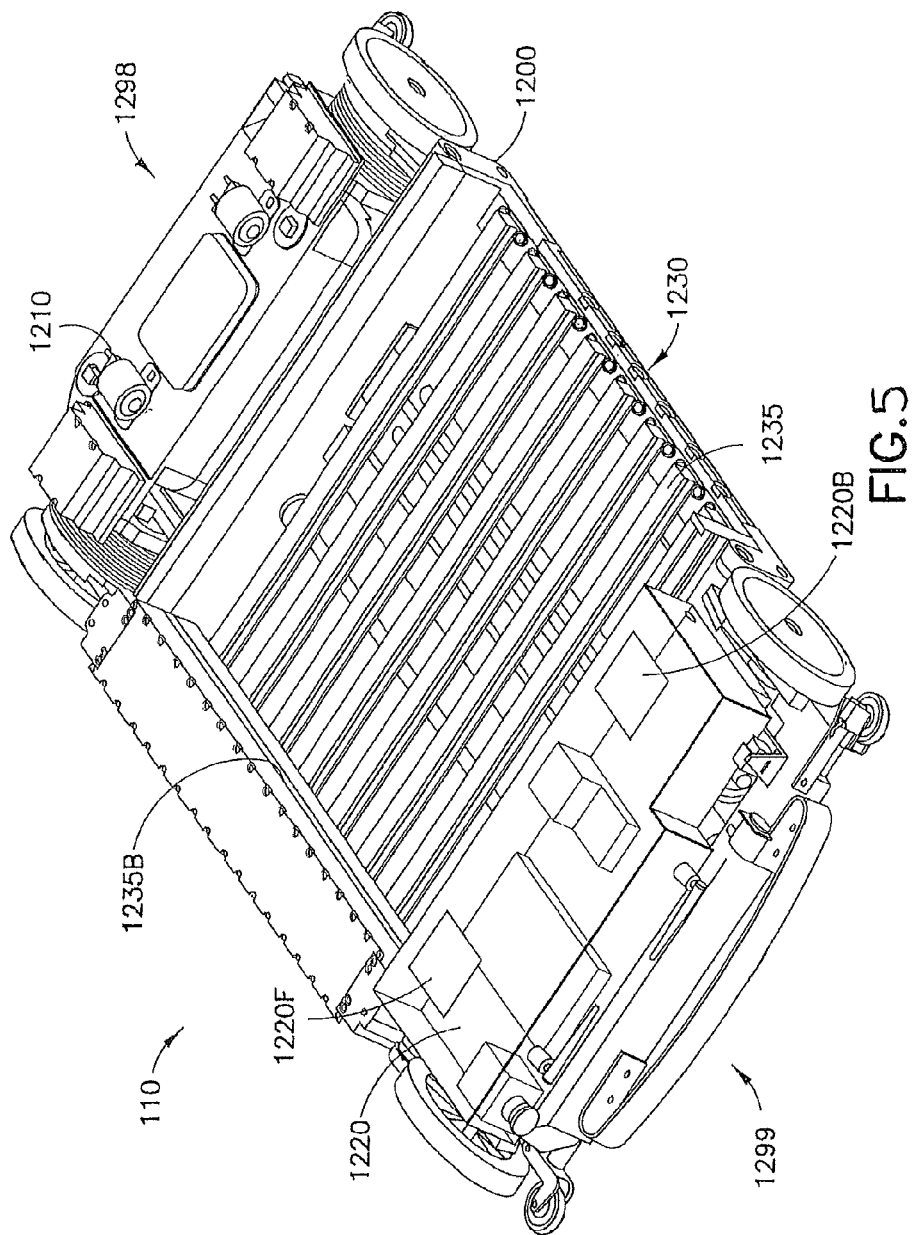
FIG. 5 illustrate a transport robot in accordance with an aspect of the disclosed embodiment.

As can be seen in FIG. 5, the bots 110 generally include a frame 1200, a drive system 1210, a control system 1220, and a payload area 1230. The drive system 1210 and control system 1220 may be mounted to the frame in any suitable manner. The frame may form the payload area 1230 and be configured for movably mounting a transfer arm or effector 1235 to the bot 110.

The transfer arm 1235 may be movably mounted to the frame 1200 within, for example, the payload area 1230. It is noted that the payload area 1230 and transfer arm 1235 may be suitably sized for transporting cases in the storage and retrieval system 100. For example, the width W of the payload area 1230 and transfer arm 1235 may be substantially the same as or larger than a depth D (FIG. 13B) of the storage shelves 600. In another aspect, the length L of the payload area 1230 and transfer arm 1235 may be substantially the same as or larger than the largest item length transferred through the system 100 with the item length being oriented along the longitudinal axis 1470 (FIG. 6) of the bot 110.

Figure 6:
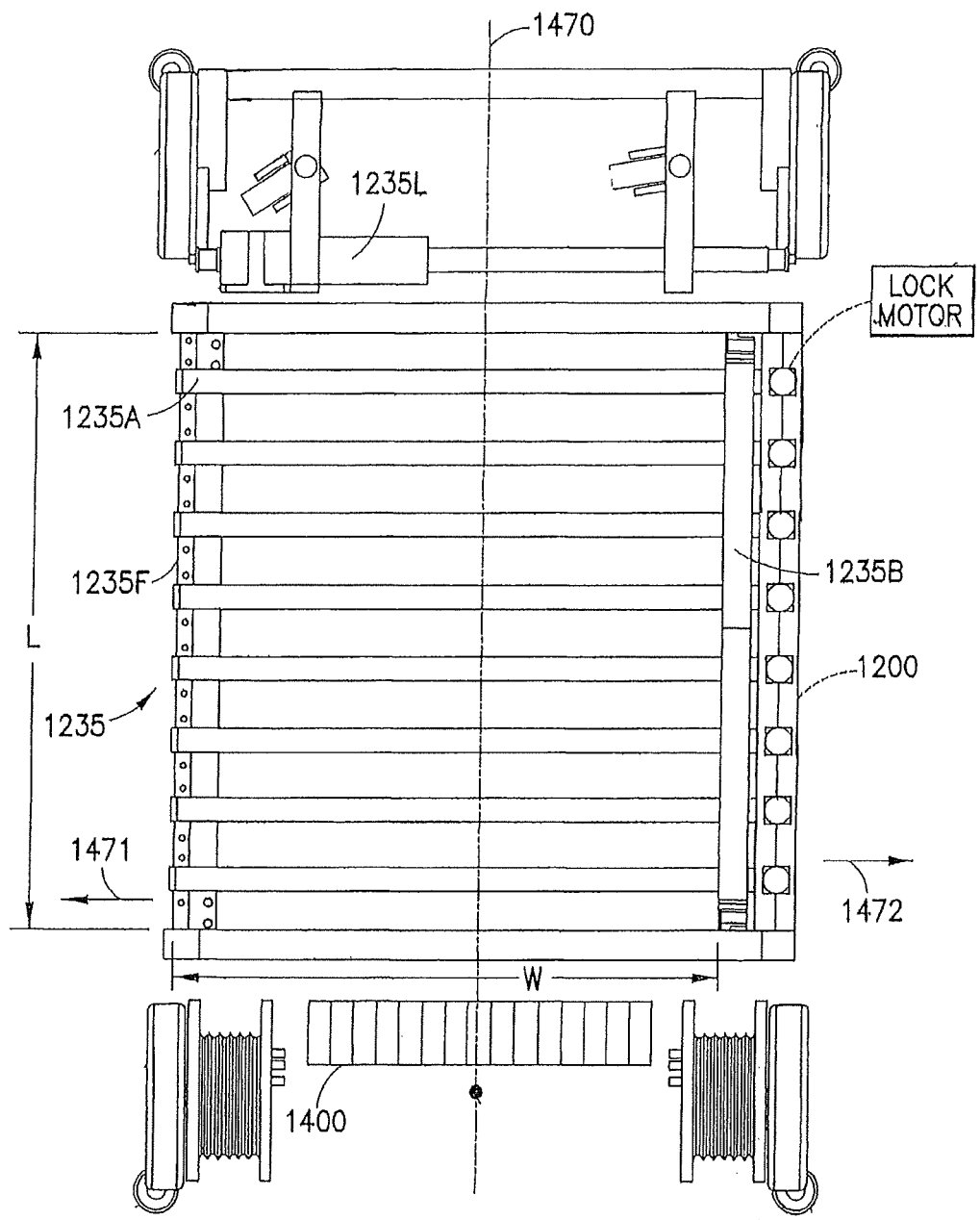
FIG. 6 illustrate partial schematic views of the transport robot of FIG. 5 in accordance with an aspect of the disclosed embodiment.

Referring also to FIG. 6, in this exemplary embodiment the transfer arm 1235 may include an array of fingers 1235A, one or more pusher bars 1235B and a fence 1235F. In other aspects the transfer arm may have any suitable configuration and/or components. The transfer arm 1235 may be configured to extend and retract from the payload area 1230 for transferring loads to and from the bot 110. In one aspect of the disclosed embodiment, the transfer arm 1235 may be configured to operate or extend in a unilateral manner relative to the longitudinal axis 1470 of the bot (e.g. extend from one side of the bot in direction 1471) for increasing, for example, reliability of the bot while decreasing the bots complexity and cost. It is noted that where the transfer arm 1235 is operable only to one side of the bot 110, the bot may be configured to orient itself for entering the picking aisles 130A and/or transfer areas 295 with either the drive end 1298 or the driven end 1299 facing the direction of travel so that the operable side of the bot is facing the desired location for depositing or picking a load. In other aspects the bot 110 may be configured such that the transfer arm 1235 is operable or extendable in a bilateral manner relative to the longitudinal axis 1470 of the bot (e.g. extendable from both sides of the bot in directions 1471 and 1472). It is noted that the bot configuration described herein is exemplary in nature, and in other aspects the bot may have any suitable configuration. It is also noted that the transfer arm of the bot may pick and/or place case units from everywhere along the rack surface.

The transfer arm 1235 may include any suitable lifting device(s) 1235L configured to move the transfer arm 1235 in a direction substantially perpendicular to a plane of extension/retraction of the transfer arm 1235.

Figure 7A:
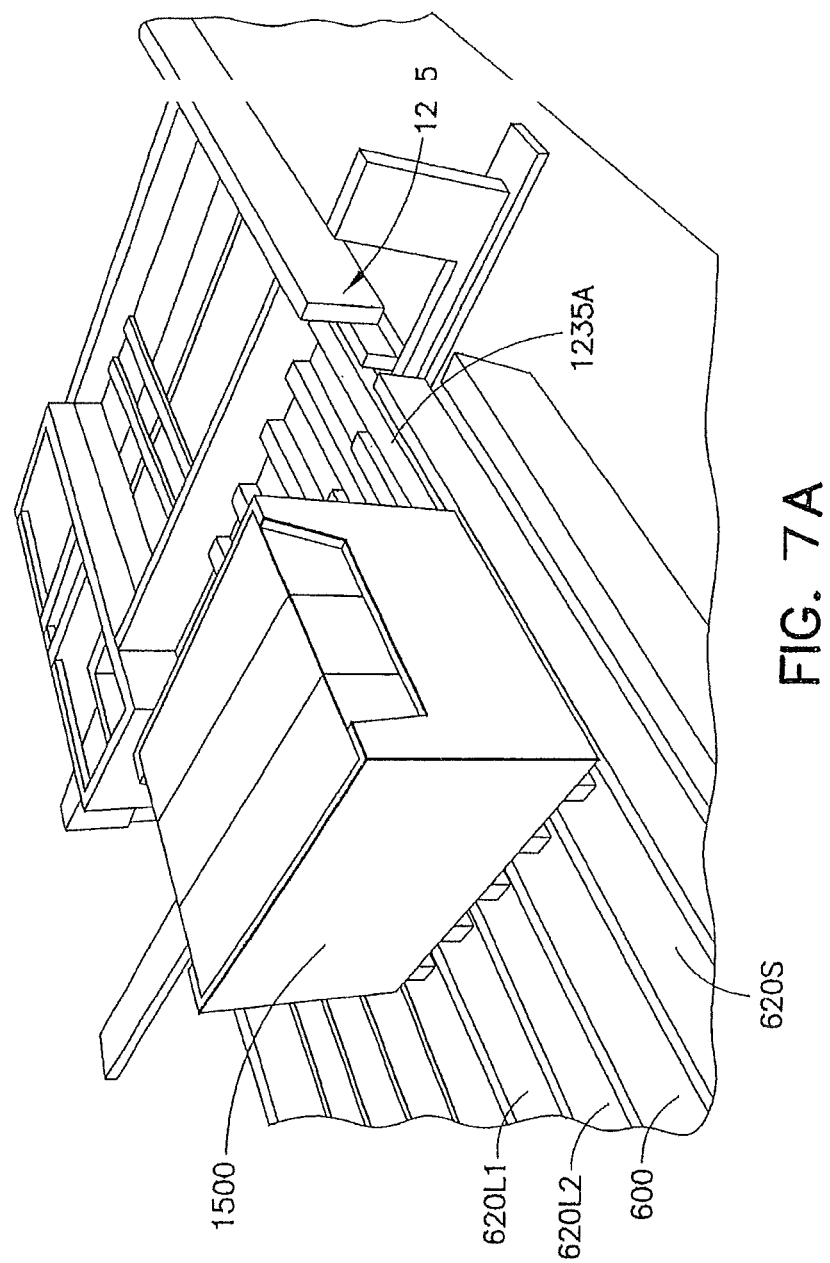

Referring also to FIGS. 7A-7B, in one example, a load (substantially similar to pickfaces 750-753) is acquired from, for example, a storage shelf 600 by extending the fingers 1235A of the transfer arm 1235 into the spaces 620S between support legs 620L1, 620L2 of the storage shelf 600 and under one or more target case units 1500 located on the shelf 600. The transfer arm lift device 1235L is suitably configured to lift the transfer arm 1235 for lifting the one or more target case units 1500 (e.g. pickface) off of the shelf 600. The fingers 1235A are retracted so that the one or more target case units are disposed over the payload area 1230 of the bot 110. The lift device 1235L lowers the transfer arm 1235 so the one or more target case units are lowered into the payload area 1230 of the bot 110. In other aspects, the storage shelves 600 may be configured with a lift motor for raising and lowering the target case units where the transfer arm 1235 of the bot 110 does not include a lift device 1235L. It is also noted that in one aspect the extension of the transfer arm 1235 may be controlled for retrieving a predetermined number of case units from an array of case units. For example, the fingers 1235A in FIG. 7B may be extended so that only item 1502A is retrieved while item 1502B remains on the shelf 1550. In another aspect, the fingers 1235A may be extended only part way into a shelf 600 (e.g. an amount less than the depth D of the shelf 600) so that a first item located at, for example, the front of the shelf (e.g. adjacent the picking aisle) is picked while a second item located at the back of the shelf, behind the first item, remains on the shelf.

Figure 8:
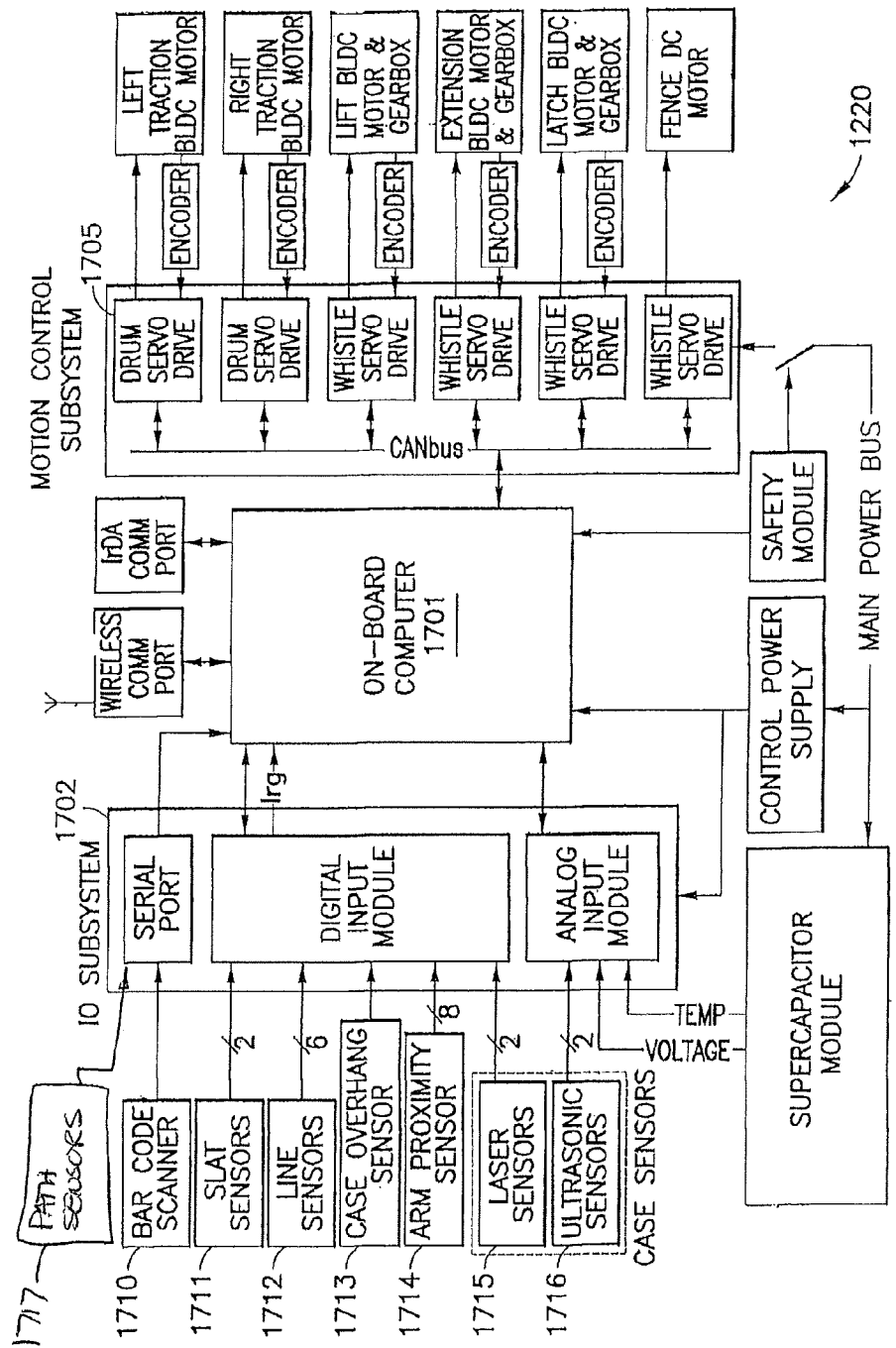
FIG. 8 schematically illustrates a control system of the transport robot of FIG. 7 in accordance with an aspect of the disclosed embodiment.

Referring now to FIG. 8, an exemplary control system 1220 of the bot is shown. The control system 1220 may be configured to provide communications, supervisory control, bot localization, bot navigation and motion control, case sensing, case transfer and bot power management. In other aspects the control system 1220 may be configured to provide any suitable services to the bot 110. The control system 1220 may include any suitable programs or firmware configured for performing the bot operations described herein. The control system 1220 may be configured to allow for remote (e.g. over a network) debugging of the bot. In one example, the firmware of the bot may support a firmware version number that can be communicated over, for example, the network 180 so the firmware may be suitably updated. The control system 1220 may allow for assigning a unique bot identification number to a respective bot 110 where the identification number is communicated over the network 180 (FIG. 1) to, for example, track a status, position or any other suitable information pertaining to the bot 110. In one example, the bot identification number may be stored in a location of the control system 1220 such that the bot identification number is persistent across a power failure but is also changeable.

In one aspect of the disclosed embodiment, the control system 1220 may be divided into a front end 1220F (FIG. 5) and back end 1220B (FIG. 5) having any suitable subsystems 1702, 1705. The control system 1220 may include an on-board computer 1701 having, for example, a processor, volatile and non-volatile memory, communication ports and hardware interface ports for communicating with the on-board control subsystems 1702, 1705. The subsystems may include a motion control subsystem 1705 and an input/output subsystem 1702. In other aspects, the bot control system 1220 may include any suitable number of portions/subsystems.

The front end 1220F may be configured for any suitable communications (e.g. synchronous or asynchronous communications regarding bot commands, status reports, etc.) with the control server 120. The bot front end 1220F may be configured as a pair of state machines where a first one of the state machines handles communication between the front end 1220F and the control server 120 and a second one of the state machines handles communication between the front end 1220F and the back end 1220B. In other aspects the front end 1220F may have any suitable configuration. The back end 1220B may be configured to effect the functions of the bot described above (e.g. lowering the casters, extending the fingers, driving the motors, etc.) based on, for example, the primitives received from the front end 1220F. In one example, the back end 122B may monitor and update bot parameters including, but not limited to, bot position and velocity and send those parameters to the, bot front end 1220F. The front end 1220F may use the parameters (and/or any other suitable information) to track the bots 110 movements and determine the progress of the bot task(s). The front end 1220F may send updates to, for example, the bot proxy 2680 so that the control server 120 can track the bot movements and task progress and/or any other suitable bot activities.

The motion control subsystem 1705 may be part of the back end 1220B and configured to effect operation of, for example, drive motors of the bot 110. The motion control subsystem 1705 may operatively connected to the computer 1701 for receiving control instructions for the operation of, for example, servo drives (or any other suitable motor controller) resident in the motion control subsystem 1705 and subsequently their respective drive motors The input/output subsystem 1702 may also be part of the back end 1220B and configured to provide an interface between the computer 1701 and one or more sensors 1710-1716 of the bot 110. The sensors may be configured to provide the bot with, for example, awareness of its environment and external objects, as well as the monitor and control of internal subsystems. For example, the sensors may provide guidance information, payload information or any other suitable information for use in operation of the bot 110. For exemplary purposes only, the sensors may include a bar code scanner 1710, slat sensors 1711, line sensors 1712, case overhang sensors 1713, arm proximity sensors 1714, laser (and/or infrared sensors and/or other optical scanning sensors) sensors 1715 and ultrasonic sensors 1716 as described in U.S. patent application Ser. No. 12/757,312, previously incorporated herein by reference.

In one aspect, the laser (and/or infrared sensors and/or other optical scanning sensors) sensors 1715 and ultrasonic sensors 1716 (collectively referred to as case sensors) may be configured to allow the bot 110 to locate itself relative to each case unit forming the load carried by the bot 110 before the case units are picked from, for example, the storage shelves 600 and/or multilevel vertical conveyor (or any other location suitable for retrieving payload). The case sensors may also allow the bot to locate itself relative to empty storage locations for placing case units in those empty storage locations and/or allow the bot to map the location of the case units within the storage structure for comparison with a stored map of the case units stored in, for example, the control server 120 or any other suitable location as will be described below. This location of the bot relative to the case units to be picked and/or empty storage locations for placing the case units may be referred to as bot localization. The case sensors may also allow the bot 110 to confirm that a storage slot (or other load depositing location) is empty before the payload carried by the bot is deposited in, for example, the storage slot. In one example, the laser sensor 1715 may be mounted to the bot at a suitable location for detecting edges of items to be transferred to (or from) the bot 110. The laser (and/or infrared sensors and/or other optical scanning sensors) sensor 1715 may work in conjunction with, for example, retro-reflective tape (or other suitable reflective surface, coating or material) located at, for example, the back of the shelves 600 to enable the sensor to "see" all the way to the back of the storage shelves 600. The reflective tape located at the back of the storage shelves allows the laser sensor 1715 to be substantially unaffected by the color, reflectiveness, roundness or other suitable characteristics of the items located on the shelves 600. The ultrasonic sensor 1716 may be configured to measure a distance from the bot 110 to the first item in a predetermined storage area of the shelves 600 to allow the bot 110 to determine the picking depth (e.g. the distance the fingers 1235A travel into the shelves 600 for picking the item(s) off of the shelves 600). One or more of the case sensors may allow for detection of case orientation (e.g. skewing of cases within the storage shelves 600) by, for example, measuring the distance between the bot 110 and a front surface of the case units to be picked as the bot 110 comes to a stop adjacent the case units to be picked. The detection of case orientation may also allow for verification that case units are oriented in a predetermined orientation after a disturbance such as a seismic or other event that causes movement of the storage structure (e.g. whether the case units are skewed from the predetermined orientation on the storage shelf such as after a seismic or other event that may cause movement of the case units). The case sensors may allow verification of placement of a case unit on, for example, a storage shelf 600 by, for example, scanning the case unit after it is placed on the shelf. The bot may also include one or more path sensors 1717, which may be substantially similar to the case sensors, however the path sensors 1717 may be disposed at the front and rear of the bot and configured to detect any obstructions that are located within the path of the bot such as in, for example, the picking aisles or transfer decks. The bot may also include any other suitable sensors for allowing the bot 110 to determine its location within the storage and retrieval system and/or scan, lead, image or otherwise detect the case units for mapping the locations of the case units on the storage shelves.

Referring again to FIG. 1, and as described above, the storage structure 130 may include multiple levels of storage rack modules where each level includes an array of storage spaces (arrayed on the multiple levels and in multiple rows on each level), picking aisles 130A formed between the rows of storage spaces, and transfer decks 130B. The picking aisles 130A and transfer decks 130B being arranged for allowing the bots 110 to traverse respective levels of the storage structure 130 for placing case units into the picking stock and to retrieve the ordered case units. The bots 110 may be configured to place case units, such as the above-described retail merchandise, into picking stock in the one or more levels of the storage structure 130 and then selectively retrieve ordered case units for shipping the ordered case units to, for example, a store or other suitable location. As may be realized, the storage and retrieval system may be configured to allow random accessibility to the storage spaces as will be described in greater detail below. For example, all storage spaces in the storage structure 130 may be treated substantially equally when determining which storage spaces are to be used when picking and placing case units from/to the storage structure 130 such that any storage space of sufficient size can be used to store case units. The storage structure 130 of the aspects of the disclosed embodiment may also be arranged such that there is no vertical or horizontal array partitioning of the storage structure. For example, each multilevel vertical conveyor 150A, 150B is common to all storage spaces (e.g. the array of storage spaces) in the storage structure 130 such that any bot 110 can access each storage space and any multilevel vertical conveyor 150A, 150B can receive case units from any storage space on any level so that the multiple levels in the array of storage spaces substantially act as a single level (e.g. no vertical partitioning). The multilevel vertical conveyors 150A, 150B can also receive case units from any storage space on any level of the storage structure 130 (e.g. no horizontal partitioning).

The bots 110 and other suitable features of the storage and retrieval system 100 may be controlled by, for example, one or more central system control computers (e.g. control server) 120 through, for example, any suitable network 180. The network 180 may be a wired network, a wireless network or a combination of a wireless and wired network using any suitable type and/or number of communication protocols. It is noted that, in one aspect of the disclosed embodiment, the system control server 120 may be configured to manage and coordinate the overall operation of the storage and retrieval system 100 and interface with, for example, a warehouse management system, which in turn manages the warehouse facility as a whole. The control server 120 may be substantially similar to that described in, for example, U.S. patent application Ser. No. 12/757,337 entitled "CONTROL SYSTEM FOR STORAGE AND RETRIEVAL SYSTEMS," filed on Apr. 9, 2010, the disclosure of which is incorporated by reference herein in its entirety. For example, the control server 120 may include a collection of substantially concurrently running programs that are configured to manage the storage and retrieval system 100 including, for exemplary purposes only, controlling, scheduling, and monitoring the activities of all active system components, managing inventory and pickfaces, and interfacing with a warehouse management system 2500. In one example, all case units forming a given pickface are of the same stock keeping unit (SKU) and originally from the same pallet. In other aspects, each pickface may include any suitable case units. Each pickface may correspond to all or part of a bot load (e.g. the load carried by each bot 110 to and from the storage areas). Conversely, the bot load may be established based on a pickface determination. As may be realized the determination of the pickfaces may be variable within the storage and retrieval system such that the size and locations of the pickface are dynamically changeable. It is also noted that interfacing with the warehouse management system allows the control server 120 to receive and execute pallet orders and to submit and execute replenishment orders. The active system components may be the physical entities that act upon the case units to be stored and retrieved. The active system components may include, as a non-limiting example, the bots, in-feed and out-feed stations, multilevel vertical conveyors, the network and user interface terminals. In other aspects, the active system components may also include transfer stations. The control server 120 may be configured to order the removal of case units from the storage and retrieval system for any suitable purpose, in addition to order fulfillment, such as, for example, when case units are damaged, recalled or an expiration date of the case units has expired.

As may be realized case units of the same type may be stored in different locations within the storage structure 130 so that at least one of that type of item may be retrieved when other ones of that type of item are inaccessible. The storage and retrieval system may also be configured to provide multiple access paths or routes to each storage location (e.g. pickface) so that bots may reach each storage location using, for example, a secondary path if a primary path to the storage location is obstructed. It is noted that the control server 120 and one or more sensors on the bots 110 may allow for the assignment and reservation of a pickface for putting away an inbound item such as during replenishment of the storage and retrieval system 100. In one aspect of the disclosed embodiment, when a storage slot/space becomes available in the storage structure 130, the control server 120 may assign a fictitious item (e.g. an empty case) to the empty storage slot. If there are adjacent empty slots in the storage structure the empty cases of the adjacent storage slots may be combined to fill the empty space on the storage shelf. As may be realized, the size of the slots may be variable such as when dynamically allocating shelf space. For example, referring also to FIGS.

14A-14C, instead of placing case units 5011 and 5012 in predetermined storage areas on the storage shelf 5001, the storage slots may be dynamically allocated such that the cases 5011, 5012 are replaced by three cases having the size of case unit 5010. For example, FIG. 14A illustrates a storage bay 5000 divided into storage slots S1-S4 as is done in conventional storage systems. The size of the storage slots S1-S4 may be a fixed size dependent on a size of the largest item (e.g. item 5011) to be stored on the shelf 600 of the storage bay 5000. As can be seen in FIG. 14A, when case units 5010, 5012, 5013 of varying dimensions, which are smaller than item 5011, are placed in a respective storage slot S1, S2, S4 a significant portion of the storage bay capacity, as indicated by the shaded boxes, remains unused. In accordance with an aspect of the disclosed embodiment, FIG. 14B illustrates a storage bay 5001 having dimensions substantially similar to storage bay 5000. In FIG. 14B the case units 5010-5016 are placed on the shelf 600 in predetermined storage positions using dynamic allocation such that the empty storage slots are substantially continuously resized as uncontained case units are placed on the storage shelves (e.g. the storage slots do not have a predetermined size and/or location on the storage shelves). As can be seen in FIG. 14B, dynamically allocating the storage space allows placement of case units 5014-5016 on shelf 600 in addition to case units 5010-5013 (which are the same case units placed in storage bay 5000 described above) such that the unused storage space, as indicated by the hatched boxes, is less than the unused storage space using the fixed slots of FIG. 14A. FIG. 14C illustrates a side by side comparison of the unused storage space for the fixed slots and dynamic allocation storage described above. It is noted that the unused storage space of bay 5001 using dynamic allocation may be decreased even further by decreasing the amount of space between the case units 5010-5016 which may allow for placement of additional case units on the shelf 600. As may be realized, as case units are placed within the storage structure the open storage spaces may be analyzed, by for example the control server 120 so that the control server 120 determines the predetermined storage positions, after each item placement. The control server 120 may dynamically re-allocate the open storage spaces according to a changed size of the open storage space so that additional case units having a size corresponding to (or less than) a size of the re-allocated storage space may be placed in the re-allocated storage space. In other aspects, the storage slots may also be allocated so that case units that are frequently picked together are located next to each other. When a predetermined pickface is reserved for an item that is being delivered, at least a portion of the empty case sitting in the location where the item is to be placed is replaced by a fictitious item having the features (e.g. size, etc.) of the item being delivered to prevent other inbound case units from being assigned to the predetermined pickface. If the item, is smaller than the empty case that it is replacing the empty case may be resized or replaced with a smaller empty case to fill the unused portion of the storage shelf. Another item may then be placed within the storage slot corresponding to the resized smaller empty case and so on.

Figure 15:
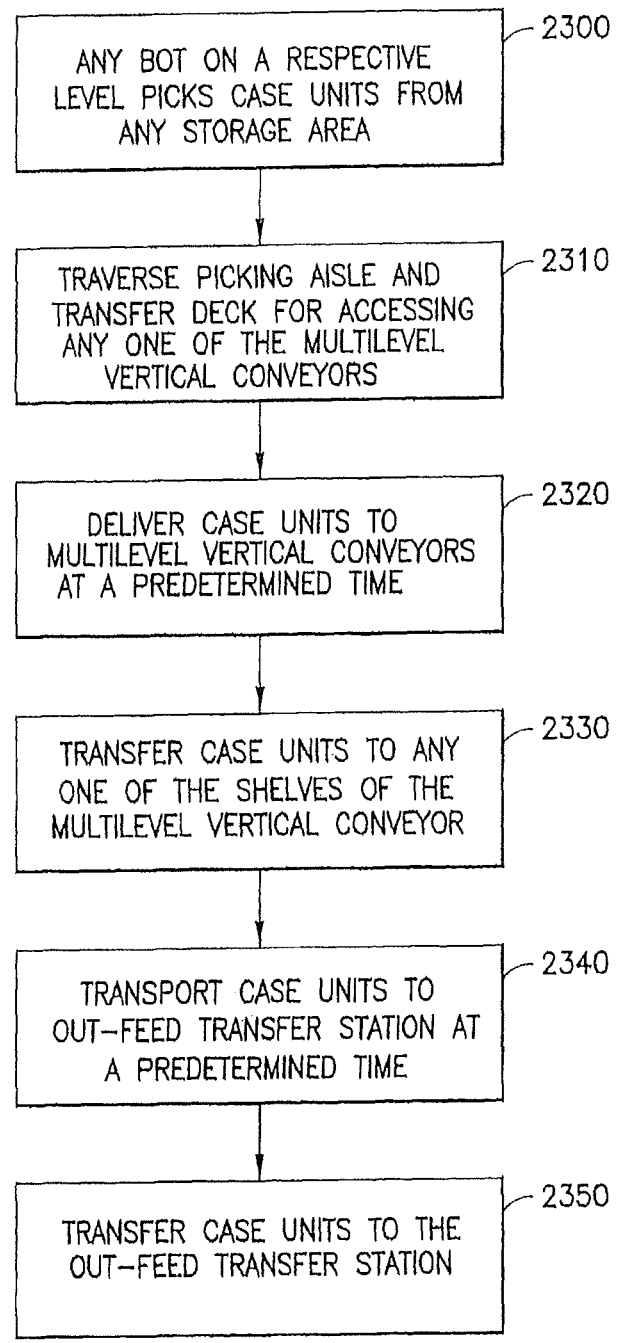
FIG. 15 is a flow diagram of an exemplary method in accordance with an aspect of the disclosed embodiment.

When an order for individual case units is made any bots 110 on the storage level of the requested case units retrieves the corresponding case units from a designated storage area of the storage structure 130 (FIG. 15, Block 2300). The bot 110 traverses the picking aisle 130A in which the case units were stored and the transfer aisle 130B for accessing any desired shelf 730 (FIG. 2A) of any one of the multilevel vertical conveyors 150B (FIG. 15, Block 2310). It is noted that the case units that comprise the order may be picked by the bots in any order. For example, a first bot 110 may traverse, for example, the transfer deck 130B for any suitable amount of time to, for example, allow other bots to pick respective case units of the order and deliver those case units to the multilevel vertical conveyor 150B if the case units of the other bots are to be delivered to the multilevel vertical conveyor before the case units of the first bot 110. As described herein, the case units may be delivered to the multilevel vertical conveyor at a predetermined time according to, for example, a predetermined sequence in a first sortation of the case units (FIG. 15, Block 2320). The bot 110 transfers the case units to the desired shelf of the multilevel vertical conveyor as described above (FIG. 15, Block 2330). In alternate embodiments, the bots may provide the case units to bot transfer stations 140 located on a level of the storage structure 130 from which the ordered case units were picked. The multilevel vertical conveyor 150B transports the individual ordered case units to the out-feed transfer stations 160 at a predetermined time according to, for example, a predetermined sequence in a second sortation of the case units (FIG. 15, Block 2340). It is noted that the multilevel vertical conveyors 150B are configured to allow the case units to continuously revolve around the conveyor loop so that the case units can be moved to, for example, an out-feed transfer station at any suitable time for fulfilling an order. For example, a first case unit is placed on a first shelf of the multilevel vertical conveyor 150B and a second case unit is placed on a second shelf of the multilevel vertical conveyor 150B where the first shelf is located in front of the second shelf in a sequence of shelves of the multilevel vertical conveyor 150B and the second case unit is to be provided to the out-feed transfer station 160 before the first case unit. The first shelf (holding the first case unit) may be allowed to pass the out-feed transfer station without unloading the first case unit to allow the second case unit to be removed from the second shelf. Thus, the case units may be placed on the shelves of the multilevel vertical conveyor 150B in any order. The out-feed transfer station 160 removes the case units from a desired shelf of the multilevel vertical conveyor at a desired time (FIG. 15, Block 2350) so that the individual case units are transported to palletizing workstations 220 (FIG. 9) by conveyors 230 (FIG. 9) where the individual case units are placed on outbound pallets (or other suitable container-like transport supports) in, for example, a predetermined sequence to form mixed pallets for shipping to a customer. The out-feed transfer stations 160 and the palletizing workstations 220 may be referred to collectively as an order assembly station. Other examples, of material handling systems in which case units are transferred to an outbound container can be found in U.S. patent application Ser. No. 10/928,289 filed on Aug. 28, 2004, and U.S. patent application Ser. No. 12/002,309 filed on Dec. 14, 2007, the disclosures of which are incorporated by reference herein in their entirety. As may be realized, the storage and retrieval system described herein allows for ordering mixed case units of any suitable quantity without having to pick and transport, for example, entire trays, totes or pallets of case units to and from the storage structure 130.

Figure 9:
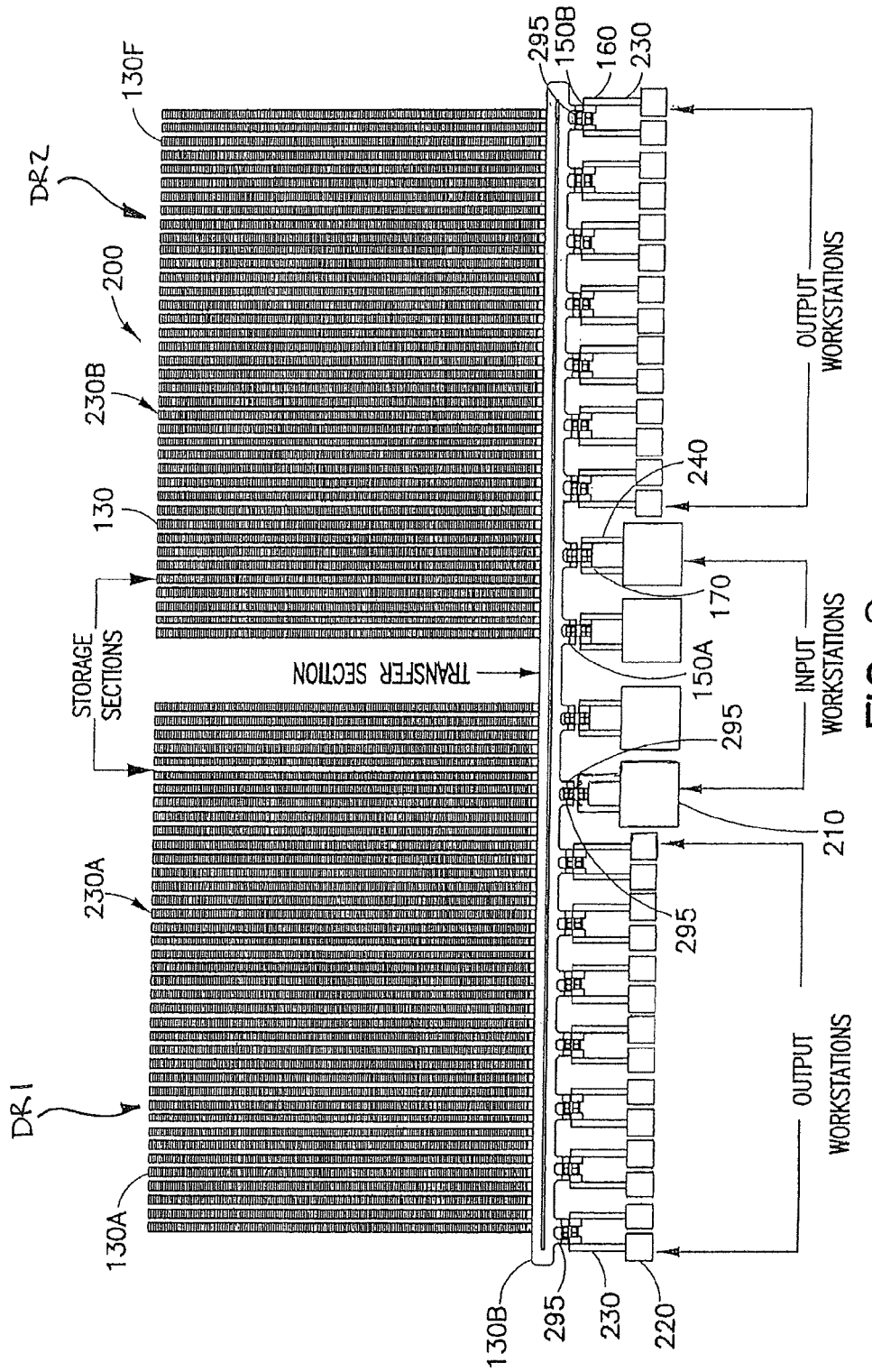
FIG. 9-11 illustrate schematic plan views of storage and retrieval systems having different configurations in accordance with aspects of the disclosed embodiment.
Figure 10:
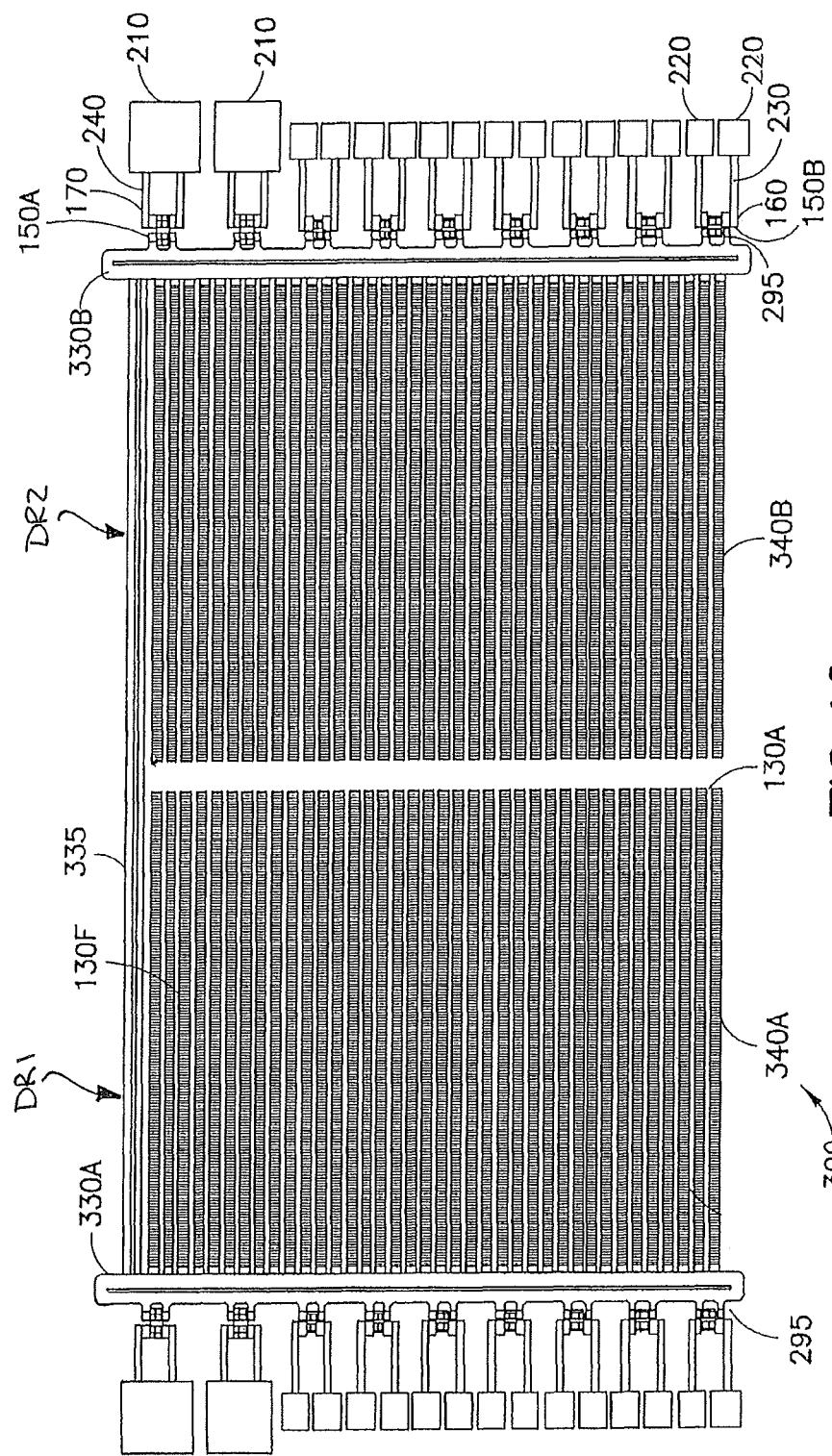
Figure 11:
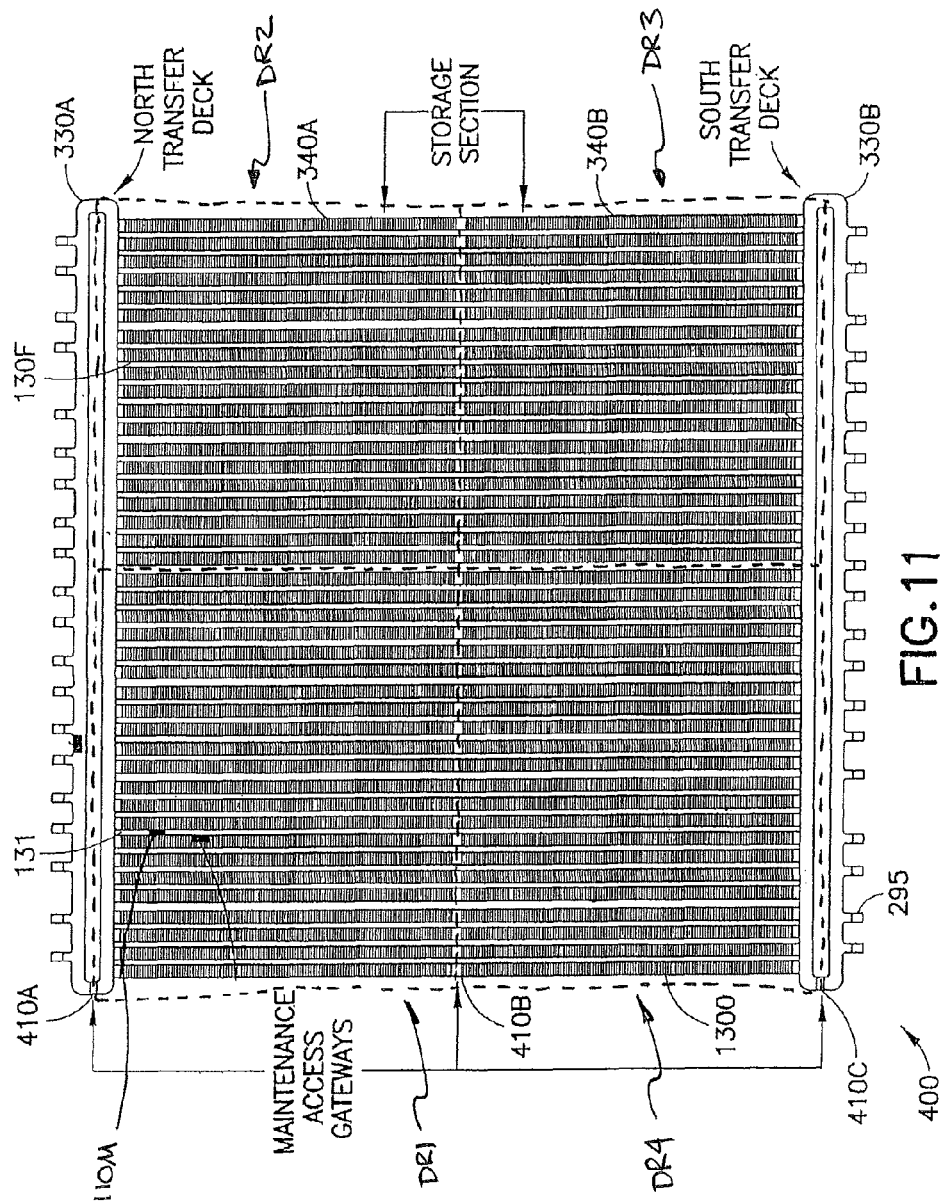

Referring now to FIGS. 9-11, exemplary configurations of the storage and retrieval system 100 are shown in accordance with aspects of the disclosed embodiment. As can be seen in FIG. 9, the storage and retrieval system 200 is configured as a single-ended picking structure in which only one side of the system 200 has a transfer section or deck 130B. The single-ended picking structure may be used in, for example, a building or other structure having loading docks disposed only on one side of the building. As can be seen in FIG. 9, the transfer deck 130B and picking aisles 130A allow bots 110 to traverse an entirety of a level of the storage structure 130 on which that bot 110 is located for transporting case units between any suitable storage locations/picking aisles 130A and any suitable multilevel vertical conveyors 150A, 150B. In this exemplary embodiment, the storage and retrieval system 200 includes a first and second storage section 230A, 230B located side by side so that the picking aisles of each section are substantially parallel with each other and facing the same direction (e.g. towards transfer deck 130B).

FIG. 10 illustrates a storage and retrieval system 300 having a double sided picking structure for use in, for example, buildings or other structures having loading docks on two sides of the building. In FIG. 10 the storage and retrieval system 300 includes two storage sections 340A, 340B that are arranged so that the picking aisles 130A in each of the storage sections 340A, 340B are parallel with each other but facing opposing directions such that substantially continuous picking aisles are formed between the opposing transfer decks 330A, 330B. As may be realized, an express travel lane 335 may be located between the opposing transfer decks 330A, 330B for allowing bots 110 to transit between the transfer decks 330A, 330B at greater speeds than those allowed within the picking aisles 130A. As may also be realized the bots 110 on each level of the picking structure of FIG. 10 may traverse the entirety of its respective level such that the bot 110 may serve to transport case units throughout the two storage sections 340A, 340B and to and from respective input and output workstations.

FIG. 11 illustrates a storage and retrieval system 400 substantially similar to storage and retrieval system 300. However, the storage and retrieval system 400 illustrates maintenance access gateways 410A, 410B, 410C for allowing, as an example, humans and/or service equipment to enter the storage and retrieval system for performing maintenance and/or repairs to the storage and retrieval system 400. The storage and retrieval systems may also be configured with suitable features for disabling one or more bots 110, conveyors or any other suitable features of the storage and retrieval systems in one or more areas of the storage and retrieval system 100 when maintenance is being performed within the storage and retrieval system 100. In one example, the control server 120 may be configured to disable/enable features of the storage and retrieval system.

The storage and retrieval systems, such as those described above with respect to FIGS. 9-11 may be configured to allow substantially unimpeded access to substantially all areas of the storage and retrieval system in the event of, for example, a stoppage in the system so that the system continues operation with substantially no or minimized loss in throughput. A stoppage in the system may include, but is not limited to, a disabled bot 110 within a picking aisle or on a transfer deck, a disabled multilevel vertical conveyor 150A, 150B and/or a disabled in-feed or out-feed transfer station 160, 170. As may be realized the storage and retrieval system 200, 300, 400 may be configured to allow substantially redundant access to each of the storage locations within the picking aisles 130A. For example, a loss of an input multilevel vertical conveyor 150A may result in substantially no loss of storage space or throughput as there are multiple input multilevel vertical conveyors 150A that can transport case units to each level/storage space within the storage structure 130. As another example, the loss of a bot out of a picking aisle may result in substantially no loss of storage space or throughput as there are multiple bots 110 on each level capable of transferring case units between any one of the storage spaces and any one of the multilevel vertical conveyors 150A, 150B. In still another example, the loss of a bot 110 within a picking aisle may result in substantially no loss of storage space or throughput as only a portion of a picking aisle is blocked and the storage and retrieval system may be configured to provide multiple paths of travel to each of the storage spaces or types of case units within the storage spaces. In yet another example, a loss of an output multilevel vertical conveyor 150B may result in substantially no loss of storage space or throughput as there are multiple output multilevel vertical conveyors 150B that can transport case units from each level/storage space within the storage structure 130. In the exemplary embodiments, transport of the case units (e.g. via the multilevel vertical conveyors and bots) is substantially independent of storage capacity and case unit distribution and vice versa (e.g. the storage capacity and case unit distribution is substantially independent of transport of the case units) such that there is substantially no single point of failure in either storage capacity or throughput of case units through the storage and retrieval system.

The control server 120 may be configured to communicate with the bots 110, multilevel vertical conveyors 150A, 150B, in-feed or out-feed transfer stations 160, 170 and other suitable features/components of the storage and retrieval system in any suitable manner. The bots 110, multilevel vertical conveyors 150A, 150B and transfer stations 160, 170 may each have respective controllers that communicate with the control server 120 for conveying and/or receiving, for example, a respective operational status, location (in the case of the bots 110) or any other suitable information. The control server may record the information sent by the bots 110, multilevel vertical conveyors 150A, 150B and transfer stations 160, 170 for use in, for example, planning order fulfillment or replenishment tasks.

The storage and retrieval systems shown in FIGS. 1 and 9-11 have exemplary configurations only and in other aspects the storage and retrieval systems may have any suitable configuration and components for storing and retrieving case units as described herein. For example, in other aspects the storage and retrieval system may have any suitable number of storage sections, any suitable number of transfer decks and corresponding input and output workstations. As an example, a storage and retrieval system in accordance with the exemplary embodiments may include transfer decks and corresponding input and output stations located on three or four sides of the storage sections for serving, for example, loading docks disposed on various sides of a building.

Figure 12:
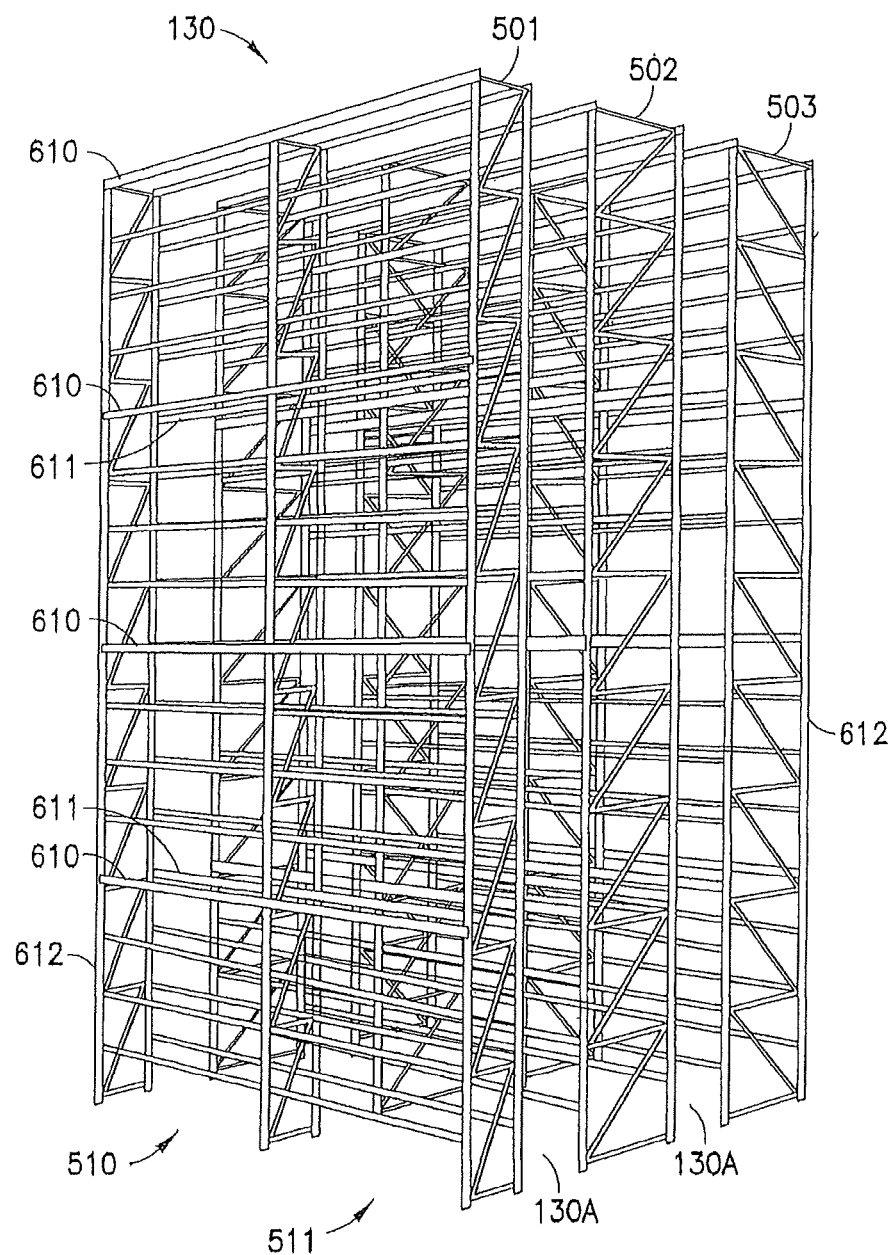
FIG. 12 illustrates a structural portion of a storage and retrieval system in accordance with an aspect of the disclosed embodiment.
Figure 13A:
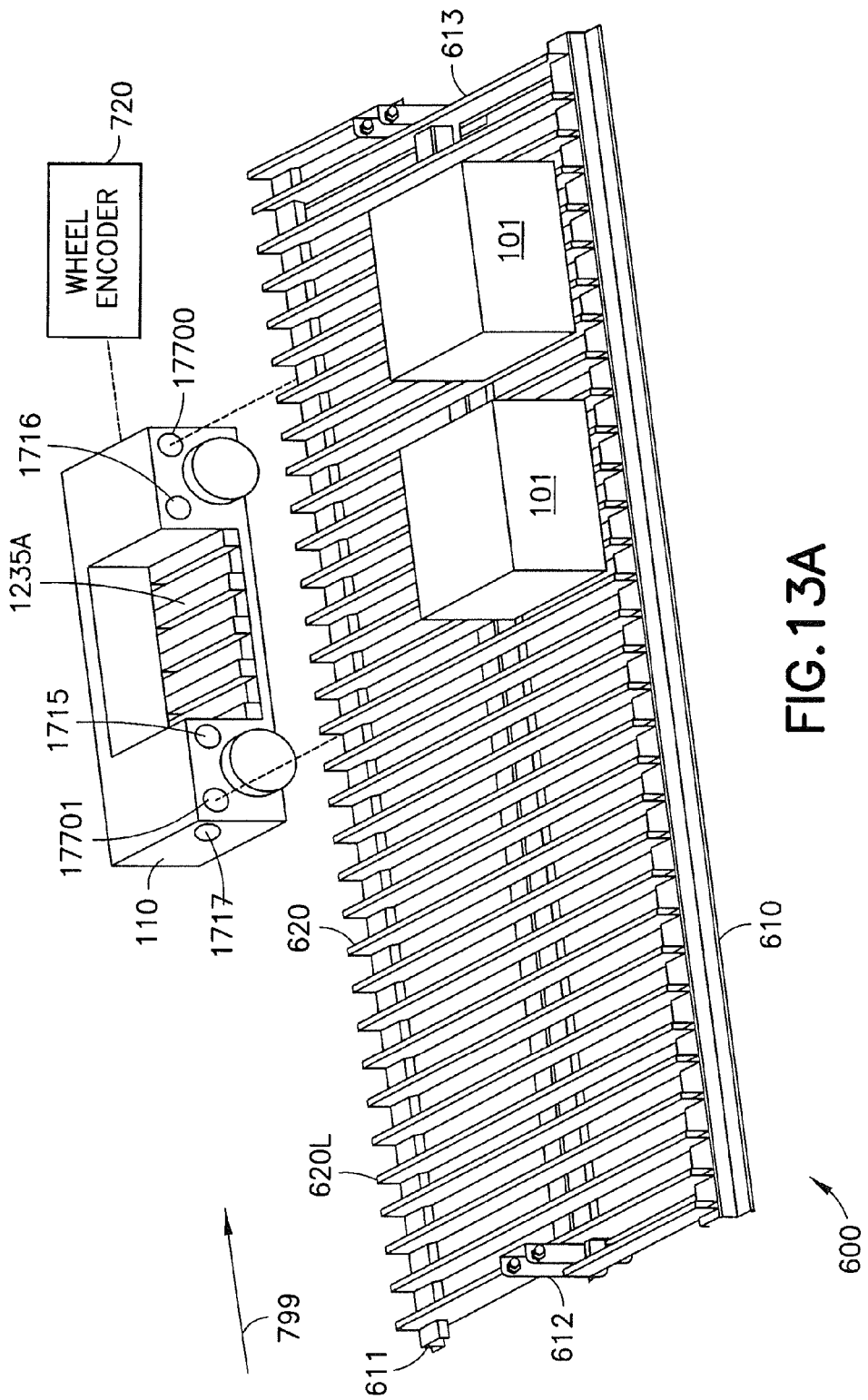
FIGS. 13A and 13B illustrate storage shelves in accordance with an aspect of the disclosed embodiment.
Figure 13B:
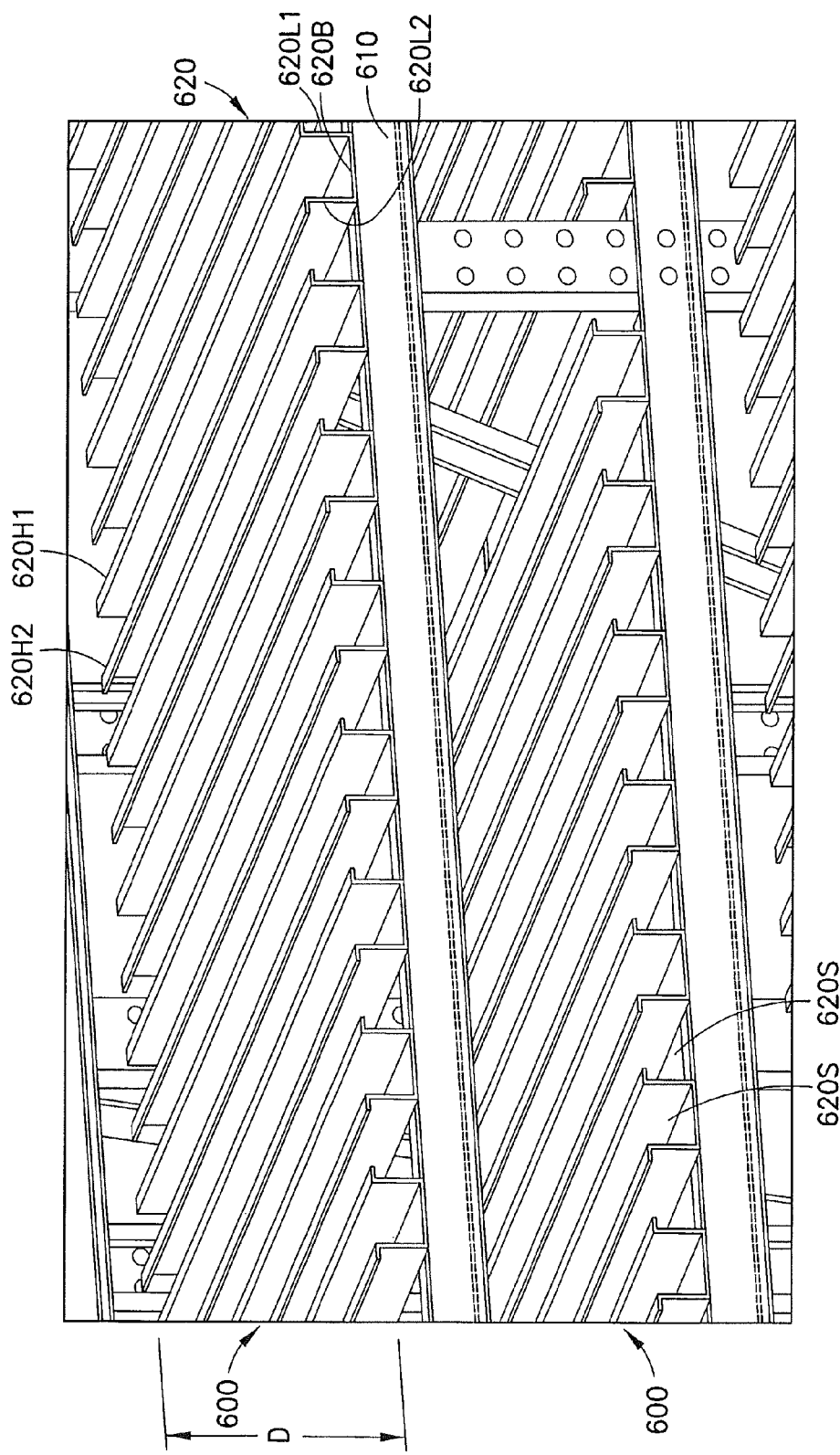

Referring also to FIGS. 12, 13A and 13B, the storage structure 130 will be described in greater detail. In accordance with an aspect of the disclosed embodiment, the storage structure 130 includes, for example, any suitable number of vertical supports 612 and any suitable number of horizontal supports 610, 611, 613. It is noted that the terms vertical and horizontal are used for exemplary purposes only and that the supports of the storage structure 130 may have any suitable spatial orientation. In this aspect of the disclosed embodiment, the vertical supports 612 and horizontal supports 610, 611, 613 may form an array of storage modules 501, 502, 503 having storage bays 510, 511. The horizontal supports 610, 611, 613 may be configured to support the storage shelves 600 (described below) as well as the floors 130F for the isle spaces 130A, which may include tracks for the bots 110. The horizontal supports 610, 611, 613 may be configured to minimize the number of splices between horizontal supports 610, 611, 613 and thus, the number of splices that, for example, tires of the bots 110 will encounter. For exemplary purposes only, the aisle floor 130F may be a solid floor constructed of plymetal panels having, for example, a wood core sandwiched between sheets of sheet metal. In other aspects the floors 130F may have any suitable layered, laminated, solid or other construction and be constructed of any suitable material(s), including, but not limited to plastics, metals, woods and composites. In yet other alternate embodiments the aisle floors 130F may be constructed of a honeycomb structure or other suitable lightweight yet substantially rigid structure. The aisle floors 130F may be coated or treated with wear resistant materials or include replaceable sheets or panels that may be replaced when worn. Tracks 1300 (FIG. 11) for the bots 110 may be incorporated into or otherwise affixed to the aisle floors 130F for guiding the bots 110 in substantially straight lines or paths of travel while the bots 110 are traveling within the storage structure 130. Suitable examples of tracks 1300 are described in U.S. patent application Ser. No. 12/757,312, previously incorporated by reference. The floors 130F may be attached to, for example, one or more of the vertical and horizontal supports (or any other suitable support structure) in any suitable manner such as with any suitable fasteners including, but not limited to bolts and welds. In one aspect of the disclosed embodiment, the tracks 1300 may be fixed to one or more vertical supports of the storage structure in any suitable manner such that the bot straddles adjacent tracks 1300 for traversing a picking aisle. One or more of the picking aisles may be substantially vertically unobstructed by floors (e.g. the picking aisles do not have floors). The absence of floors on each picking level may allow maintenance personnel to walk down the picking aisles where the height between each storage level would otherwise substantially prevent the maintenance personnel from traversing the picking aisles.

Each of the storage bays 510, 511 may hold the picking stock on storage shelves 600 that are separated by the picking aisles 130A. It is noted that in one exemplary embodiment the vertical supports 612 and/or horizontal supports 610, 611, 613 may be configured to allow for adjusting the height or elevation of the storage shelves and/or aisle floors 130F relative to, for example, each other and a floor of the facility in which the storage and retrieval system is located. In other aspects the storage shelves and floors may be fixed in elevation. As can be seen in FIG. 12, storage module 501 is configured as an end module having, for example, about half the width of the other storage modules 502, 503. As an example, the end module 501 may have a wall located on one side and the picking aisle 130A located on the opposite side. The depth D1 of end module 501 may be such that access to the storage shelves 600 on module 501 is achieved by the picking aisle 130A located on but one side of the storage module 501, whereas the storage shelves 600 of modules 502, 503 may be accessed by picking aisles 130A located on both sides of the modules 502, 503 allowing for, as an example, the storage modules 502, 503 having a depth substantially twice that of the depth D1 of storage module 501. As may be realized from the figures, the configuration of the storage shelves 600 provides what may be referred to as an open architecture, wherein the uncontained cases may be placed onto the shelf seating surface as desired in a substantially unrestricted manner in the plane of the shelf. The open configuration facilitates dynamic space allocation and positioning of stored cases, as will be further described below. Corresponding, the open architecture, without restrains, allows cases to shift on the shelf, for example under the influence of inertial forces. The storage shelves 600 may include one or more support legs 620L1, 620L2 extending from, for example, the horizontal supports 610, 611, 613. The support legs may be installed on the horizontal supports 610, 611, 613 in any suitable manner. One suitable example of how the support legs are installed on the horizontal supports can be found in U.S. Provisional Patent Application No. 61/423,206 filed on Dec. 15, 2010, the disclosure of which is incorporated herein by reference in its entirety. The support legs 620L1, 620L2 may have any suitable configuration and may be part of, for example, a substantially U-shaped channel 620 such that the legs are connected to each other through channel portion 620B. The channel portion 620B may provide an attachment point between the channel 620 and one or more horizontal supports 610, 611, 613 (see also FIG. 13A). In other aspects, each support leg 620L1, 620L2 may be configured to individually mount to the horizontal supports 610, 611, 613. In this aspect of the disclosed embodiment, each support leg 620L1, 620L2 includes a bent portion 620H1, 620H2 having a suitable surface area configured to support case units stored on the shelves 600. The bent portions 620H1, 620H2 may be configured to substantially prevent deformation of the case units stored on the shelves. In other aspects the leg portions 620H1, 620H2 may have a suitable thickness or have any other suitable shape and/or configuration for supporting case units stored on the shelves. As can be seen in FIGS. 13A and 13B, the support legs 620L1, 620L2 or channels 620 may form a slatted or corrugated shelf structure where spaces 620S between, for example, the support legs 620L1, 620L2 allow for arms or fingers of the bots 110 to reach into the shelving for transferring case units to and from the shelves as well as for example allowing the bot 110 to track its position within the storage rack structure as will be described below. It is noted that the support legs 620L1, 620L2 of the shelves 600 may be configured for storing case units, where adjacent case units are spaced any suitable distance from each other. For example, a pitch or spacing between the support legs 620L1, 620L2 in the direction of arrow 698 may be such that the case units are placed on the shelves 600 with a distance of about one pitch between the case units to, for example, minimize contact between case units as the case units are placed and removed from the shelves by the bots 110. For exemplary purposes only, case units located adjacent one another may be spaced apart, for example, in direction 698 a distance of about 2.54 cm. In other aspects the spacing between the case units on the shelves may be any suitable spacing. It is also noted that transfer of case units to and from the multilevel vertical conveyors 150A, 150B (whether the transfer is made directly or indirectly by the bot 110) may occur in a substantially similar manner to that described above with respect to the storage shelves 600.

In the aspect of the disclosed embodiment where slats may be used for bot positioning the slats 620L may be mounted to the storage shelf 600 such that the distance 620S (e.g. space between slats) places the slats 620L at known increments 130A for bot position location during picking and placing case units to the storage shelves 600. In one example, the spacing 620S between the slats 620L can be arranged to provide an incremental bot positioning system (e.g. the spacing 620S is substantially the same between all of the slats 620L where the bot location is tracked from a base or reference point such as an end of the picking aisle 130A). In another example, the spacing 620S between the support legs 620L1, 620L2 can be arranged to provide an absolute bot positioning system (e.g. the spacing 620S follows a predetermined pattern so that each space when detected by the bot provides a unique identifiable location of the bot within the picking aisle) while still allowing the fingers 1235A of the bot 110 to be inserted between the slats 620L for picking and placing case units from the storage shelves 600. In the aspects of the disclosed embodiment, substantially the same absolute encoder slat pattern may be used in each of the picking aisles while in other aspects each of the picking aisles may have a unique absolute encoder slat pattern so as to identify the aisle as well as the bot location within the aisle. It should be understood that in the aspects of the disclosed embodiment, the spacing between the slats 620L on the shelves 600 may be any suitable spacing to provide any suitable measurement scale for determining the location of the bot such as, for example, a combination of incremental and absolute positioning scales. The position of the bot may also be determined using a "map" or "fingerprint" of the cases on the storage shelves as will be described in greater detail below. In accordance with the embodiment, bot positioning may be established via other suitable features (e.g. a tape or strip encoded with incremental and/or absolute features or marks detected by the passage of the bot relative to the structure). It is also noted that transfer of case units to and from the multilevel vertical conveyors 150A, 150B (whether the transfer is made directly or indirectly by the bot 110) may occur in a substantially similar manner to that described above with respect to storage shelves 600.

Figure 13C:
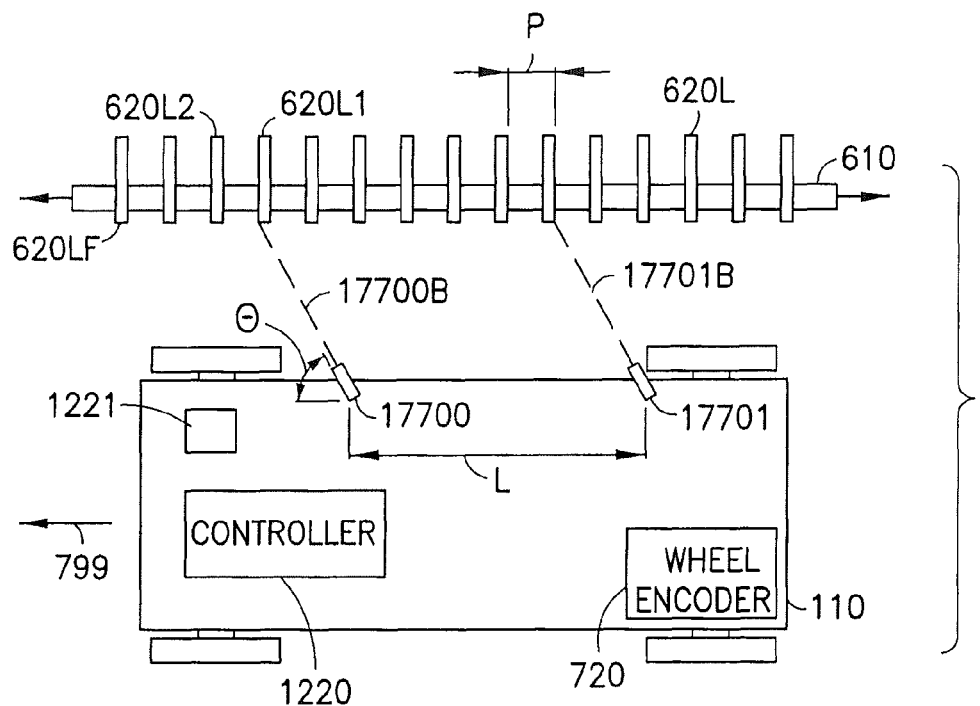
FIG. 13C is a schematic illustration of an autonomous transport vehicle and a portion of a storage shelf in accordance with an aspect of the disclosed embodiment.
Figure 13D:
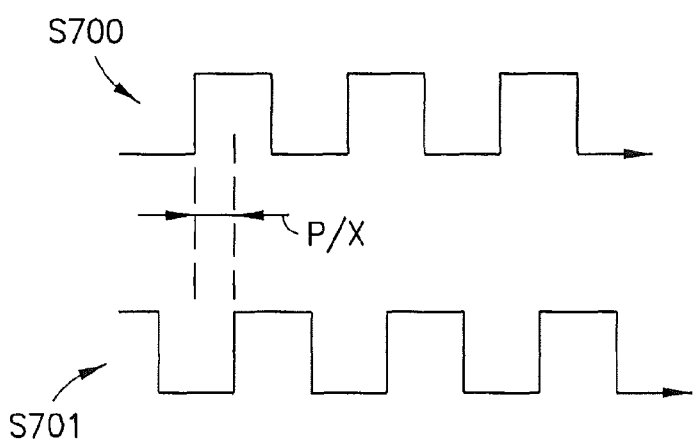
FIG. 13D is a schematic illustration of sensor output signals in accordance with an aspect of the disclosed embodiment.
Figure 13E:
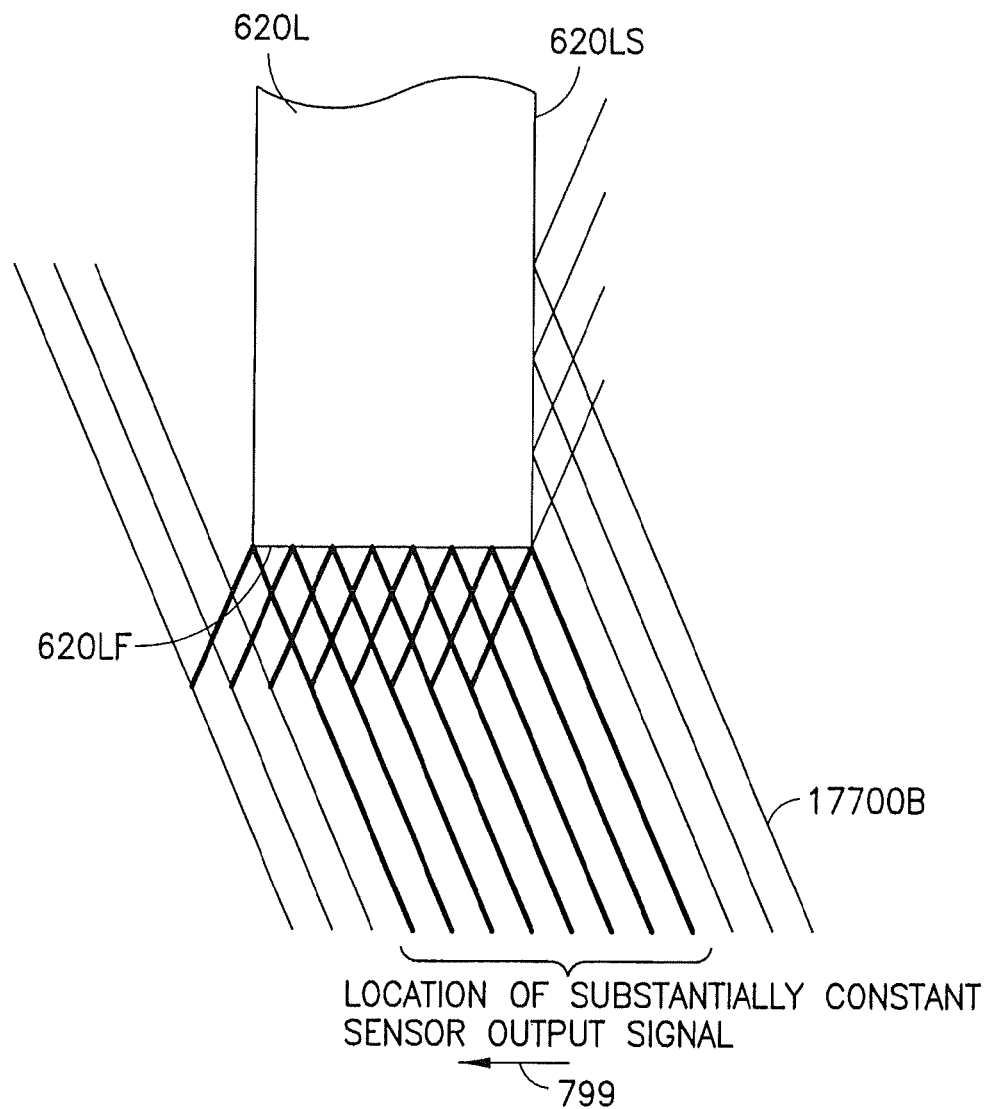
FIG. 13E is a schematic illustration of a portion of a storage shelf and sensor beam in accordance with an aspect of the disclosed embodiment.
Figure 13F:
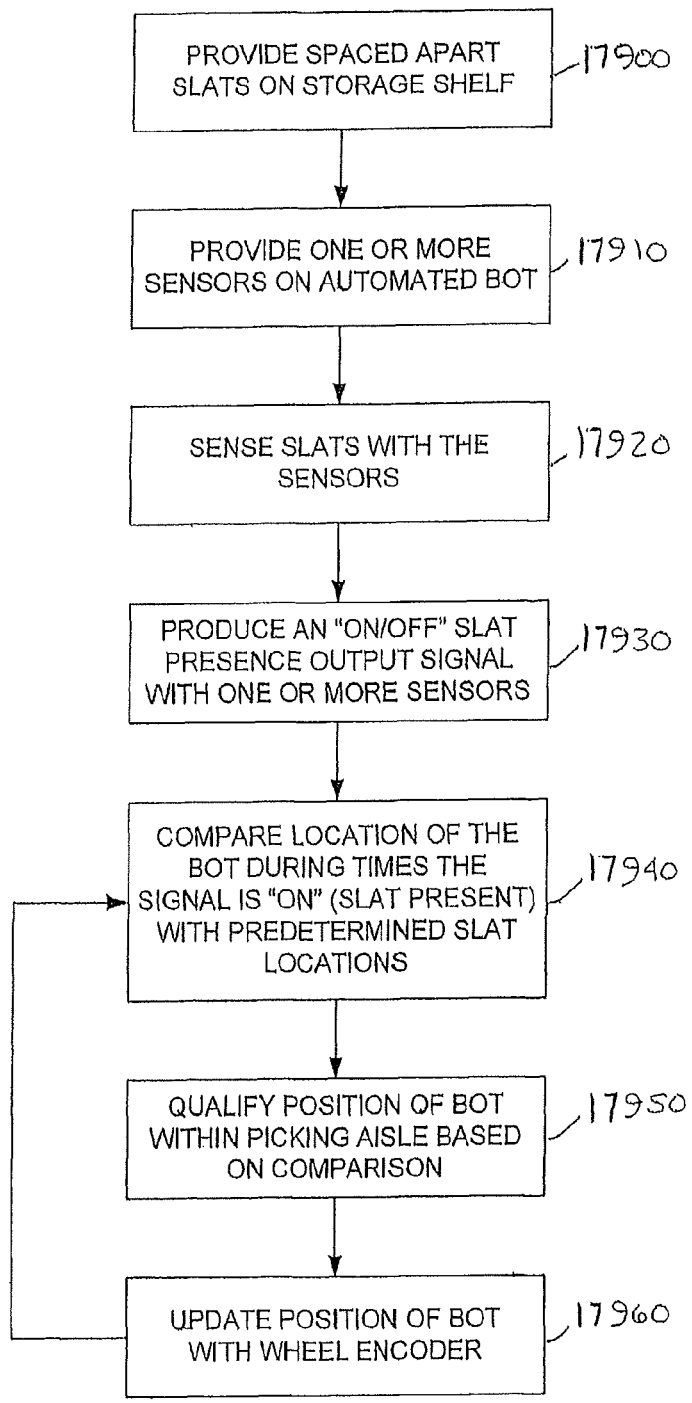
FIG. 13F is a flow diagram in accordance with an aspect of the disclosed embodiment.

Referring now to FIGS. 13A and 13C, any suitable number of sensors for detecting or sensing the slats 620L (which are provided on the storage shelf) may be provided on the bot 110 (FIG. 13F, Blocks 17900 and 17910). In the embodiments the bot 110 includes two sensors 17700, 17701 for exemplary purposes only that may be substantially similar to the case sensors 1715, 1716 described above. In the aspects of the disclosed embodiment the sensors 17700, 17701 are described as beam sensors including an emitter and a receiver. The emitter and receiver of each sensor 17700, 17701 may be housed in a unitary sensor casing or separate sensor casings of the respective sensor 17700, 17701. It should be understood that the sensors 17700, 17701 may be any suitable types of sensors including, but not limited to, beam sensors and proximity sensors such as magnetic sensors, capacitance sensors, inductance sensors and the like. The sensor 17700 may be located towards the front of the bot 110 and the sensor 17701 may be located towards the rear of the bot 110. It should be realized that the terms "front" and "rear" are relative terms and used herein for exemplary purposes only as the bot 110 may be configured to travel down the picking aisle 130A in any direction such that the front and rear of the bot, relative to the direction of bot travel, may be reversed. It should be understood that one or more sensors may be located at any suitable positions on the bot such as for example, along any suitable length of any suitable side of the bot 110. The sensors 17700, 17701 may be mounted to the bot 110 in any suitable manner such as to the chassis or any other portion of the bot 110 structure.

The sensors 17700, 17701 may be mounted to the bot 110 for detecting or otherwise sensing the slats 620L to provide, for example, an incremental (or absolute) and discrete position encoder (FIG. 13F, Block 17920) for determining a location of the bot within, for example, a picking aisle 130A or any other suitable location within the storage and retrieval system 100. The sensors 17700, 17701 may be mounted at any suitable angle θ (shown exaggerated in FIG. 13C) relative to, for example, the bot chassis and/or the face 620LF of the slats 620L for generating a signal when a respective slat 620L is sensed. It is noted that the angle θ may allow, for example, a beam emitted from the sensor to be reflected off of, for example, the slats 620L and be received by a receiver of the sensor as will be described below. As may be realized, the emitter of the beam sensor may be configured such that the emitter is angled relative to the sensor housing so that the housing can be mounted to the bot substantially parallel and/or perpendicular to one or more structural features of the bot. As may also be realized where the sensors used are proximity sensors, the sensors may not be angled as the slats are detected through, for exemplary purposes only, changes in capacitance, inductance or magnetic fields. It is noted that the sensors may have any suitable arrangement/configuration relative to the slats for detecting the slats and determining a position of the bot. As a non-limiting example only, the back surface of the shelf may have an anti-reflective property that allows the sensors to be placed so that the sensor beam of a reflective type sensor is substantially parallel to a longitudinal axis of the slats (e.g. not at an angle to the slats).

Referring also to FIG. 13E, as the bot moves through the picking aisle 130A in, for example, the direction of arrow 799 the beam 17700B emitted from the emitter of sensor 17700 strikes the side 620LS of the slat 620 and is reflected away from the sensor (e.g. the beam is not returned to the receiver of the sensor 17700). As the bot continues to move in the direction of arrow 799 the beam 17700B strikes a face 620LF of the slat 620L such that the beam 17700B is reflected back to the receiver of sensor 17700 so that the sensor produces an output signal indicating the presence of the slat 620L. During the continual movement of the bot 110 in the direction of, for example, arrow 799 the beam 17700B sweeps the face 620LF of the slat 620L such that the beam 17700B continues to be reflected back to the receiver of sensor 17700. As the receiver of sensor 17700 receives the beam 17700B the sensor 17700 provides a substantially constant output signal to, for example, any suitable controller 1220 of the bot 110 (or storage and retrieval system 100 such as control server 120). As the bot continues to move in the direction of, for example, arrow 799 the beam 17700B moves off of the slat face 620LF and is no longer reflected back to the receiver of the sensor 17700 such that the sensor discontinues to output the substantially constant output signal to indicate no slat is present. As may be realized, as the bot moves past successive slats 620L the output signals (e.g. slat present, no slat present, slat present, etc.) generated by the sensor 17700 may form of an "on/off" signal S700 as shown in FIG. 13D where the on/off output signals correspond to a pitch P (or spacing) of the slats (FIG. 13F, Block 17930). In this example, the signal S700 is illustrated as a square wave but may have any suitable waveform/shape. Sensor 17701 may operate in the same manner as that described above with respect to sensor 700 such that the beam 17701B from sensor 17701 is reflected off the slat faces 620LF to produce another "on/off" signal S701. As may be realized, the "on/off" signal may be generated in a similar manner using proximity sensors where the signal is "on" when the slat is in proximity to the sensor (e.g. slat presence is detected) and "off" when there is no slat presence detected.

The two signals S700, S701 generated by the respective sensors 17700, 17701 form, for example, incremental encoder patterns (e.g. substantially equal pitch between slats) that may be interpreted by the controller 1220 for determining a position of the bot within, for example, the picking aisle 130A. It is noted that the pitch between slats may vary in a unique manner (while still allowing enough room for fingers 1235A of the bot 110 to be inserted between the slats for picking and placing case units from the storage shelves 600) to provide an absolute encoder pattern that can be interpreted by the controller 1220 for determining the location of the bot independent of previously detected slats of the picking aisle 130A.

It is noted that the accuracy or resolution of the sensors 17700, 17701 may be increased by, for example, placing the sensors 17700, 17701 on the bot 110 such that the distance between sensors or the angle of the different sensors results in at least one of the sensors being offset from the slat pitch P by a predetermined fractional amount to effectively increase a number of slats detected by the bot for creating a finer resolution. For example, the distance L between sensors can be as follows:

$$L = mP + w,$$

where m is an integer and w is a predetermined fraction of the pitch P (e.g. P/2, P/4, . . . P/x). It is noted that the location of the slats 620L within the storage shelves 600 may be located in a predetermined configuration relative to, for example, the vertical supports 612 of the storage structure. In one example, the vertical supports 612 may not be slatted and the higher position resolution may assist in confirming the bot location so that, for example, fingers 1235A (FIG. 13A) of the bot 110 do not contact the vertical supports 612 or support slats 612L while picking/placing case units from the storage shelves 600. In another example, the vertical supports 612 may have false slats disposed thereon in a manner substantially similar to that described in U.S. Provisional Patent Application No. 61/423,206 previously incorporated by reference. In still other examples, the bot position can be determined using RFID tags or barcode labels mounted throughout the storage and retrieval structure. In this example the bot 110 may include any suitable RFID or barcode reader so that the RFID tags and/or barcodes can be read as the bot 110 travels throughout the storage and retrieval system. In still other examples the location of the bot can be determined based on odometry information and feedback from the bot drive motors and their interaction with the surface the bot rides on or against as will be described below. It should be understood that any suitable combination of the above features can be used to determine the location of the bot. As may be realized, the combination of, for example, any suitable bot location determination (such as the bot location determination described herein) and case unit sensing may allow the bot to map the locations and orientations of the case units located on the storage shelves as the bot moves through the picking aisles.

The controller 1220 of the bot 110 may have access to a storage and retrieval system structure file. The structure file may include the location of each structural feature of the storage and retrieval system including the positions for each slat 620L within their respective picking aisles 130A. The structure file may be located in any suitable memory accessible by the controller 1220. In one example, the structure file may be resident in a memory 1221 of the bot 110. In other examples, the structure file may be resident in a memory of, for example, the control server 120 and accessed by the bot 110 or uploaded to a bot memory when the location of the bot 110 is being determined. The slat locations specified by the structure file may assist in qualifying the location of the slats for determining the position of the bot 110 within, for example, a picking aisle 130A. For example, when the bot qualifies a slat such as slat 620L1 of the storage shelves 600 with one of the sensors 17700, 17701 the controller 1220 of the bot compares an estimated location of the bot 110 using bot odometry (obtained from e.g. wheel encoders 720 as described below) at the instant in time when the slat 620L1 is detected with the location of the slat 620L1 as specified by the information in the structure file (FIG. 13F, Blocks 17940 and 17950). If the comparison between the estimated bot location and the location of the slat from the structure file coincide within a predetermined tolerance the location of the bot (and the sensor sensing the slat) is qualified with the slat such that the bot 110 knows its substantially exact location within the picking aisle 130A. It is noted that the sensors 17700, 17701 may be located at a predetermined distance relative to, for example, a location of an effector or arm 1235 (FIG. 7) of the bot 110 so that the arm 1235 can be positioned, based on the sensor's determined location relative to the storage slats 620L, for inserting fingers 1235A of the arm 1235 between the slats for transferring containers between the bot 110 and the storage shelves 600. It is also noted that the controller 1220 may be configured to determine a state (acceleration, speed, direction, etc.) of the bot 110 as well as account for wheel slippage when determining the position of the bot within the storage and retrieval system as described in, for example, United States Provisional Patent Application entitled "BOT HAVING HIGH SPEED STABILITY" filed on Dec. 15, 2010, the disclosure of which is incorporated by reference herein in its entirety.

In the area between slats 620L1, 620L2 the bot 110 may be configured to obtain odometry information from wheel encoders 720 of the bot 110 to substantially continuously update an estimated position of the bot 110 (e.g. by adding the distance traveled by the bot as determined from the rotation of one or more of the bot's wheels to the bots last qualified position or any other suitable previously determined position of the bot). The estimated position of the bot 110 may be based off of, for example, the position of the last slat 620L1 detected and qualified (e.g. the location is verified through comparison with the structure file) by the bot 110 (FIG. 13F, Block 17960). For example, when the bot 100 encounters a subsequent slat 620L2 in the direction of travel 799 through the picking aisle 130A the bot 110 calculates its estimated position using the verified position of the previously detected slat 620L1 and the information from the wheel encoders 720. The bot 110 compares this estimated position against the slat position information contained in the structure file for slat 620L2 and if the two locations (i.e. the bots estimated position and the position of the slat 620L2 obtained from the structure file) coincide within the predetermined tolerance then the bot 110 knows substantially exactly where it is located within the picking aisle 130A and the bot's position within the picking aisle 130A is updated by, for example, the bot controller 1220. If the estimated location of the bot 110 (when the sensor senses the subsequent slat 620L2) is confirmed using the information in the structure file then the slat/bot location is qualified. If there is no match or confirmation then the signal output from one or more of the sensors 17700, 17701 is ignored and the substantially exact position of the bot is not updated, rather the controller 1220 of the bot continues to use the estimated position obtained from the wheel encoders 720 until the location of a subsequently sensed slat is confirmed/qualified. It is noted that in the aspects of the disclosed embodiment, the bot odometry may be reset each time a slat position is qualified. The resetting of the bot odometry may substantially eliminate any built up tolerance or other cumulative tracking errors generated by, for example, the wheel encoders 720. Alternatively, the bot odometry may not be reset when each slat is qualified such that the bot controller or any other suitable controller of the storage and retrieval system may be configured to account for any tolerance or cumulative tracking errors in the wheel encoders 720 when qualifying the locations of the slats and determining a position of the bot.

Referring again to FIG. 13A in the aspects of the disclosed embodiment the bot 110 may also include one or more suitable case sensors 1715, 1716 such as those described above configured for sensing case units 101 stored on the shelves 600 in respective seated positions. Some non-limiting examples, of case unit sensors can be found in, for example, U.S. patent application Ser. No. 12/757,312, previously incorporated by reference herein. The case sensors 1715, 1716 may be configured to allow the bot 110 to sense each case unit 101 as the bot travels along a picking aisle. The case sensors 1715, 1716 may be connected to any suitable controller such as, for example, control server 120 and/or bot controller 1220 such that patterns or sequences of case units 101 may be recognized for assisting in a location determination of the bot 110. For example, the control server 120 may include a "map" or "fingerprint" of case units (including their respective sizes, positions, spacing between the case units, etc.) for each picking aisle. As the bot 110 travels through the picking aisle the controller, such as control server 120 (or bot controller 1220) may receive and interpret signals from the case sensors 1715, 1716 indicating, for example, the sizes and relative positions of the case units 101 the bot is passing. The control server 120, for example, may compare these signals with the case unit map/fingerprint (e.g. the predetermined positions of each case unit as determined by the controller) for determining, for example, which aisle the bot is in and which portion of the aisle the bot is in (e.g. the location of the bot within the aisle). In one example, as the bot 110 turns down a picking aisle the case units 101 may be sensed and the control server 120 may determine if the bot 110 is in the correct aisle based on the sensed case units. It is noted that the fingerprint of cases may be dynamic as cases are added and removed from the shelves 600.

Figure 16:
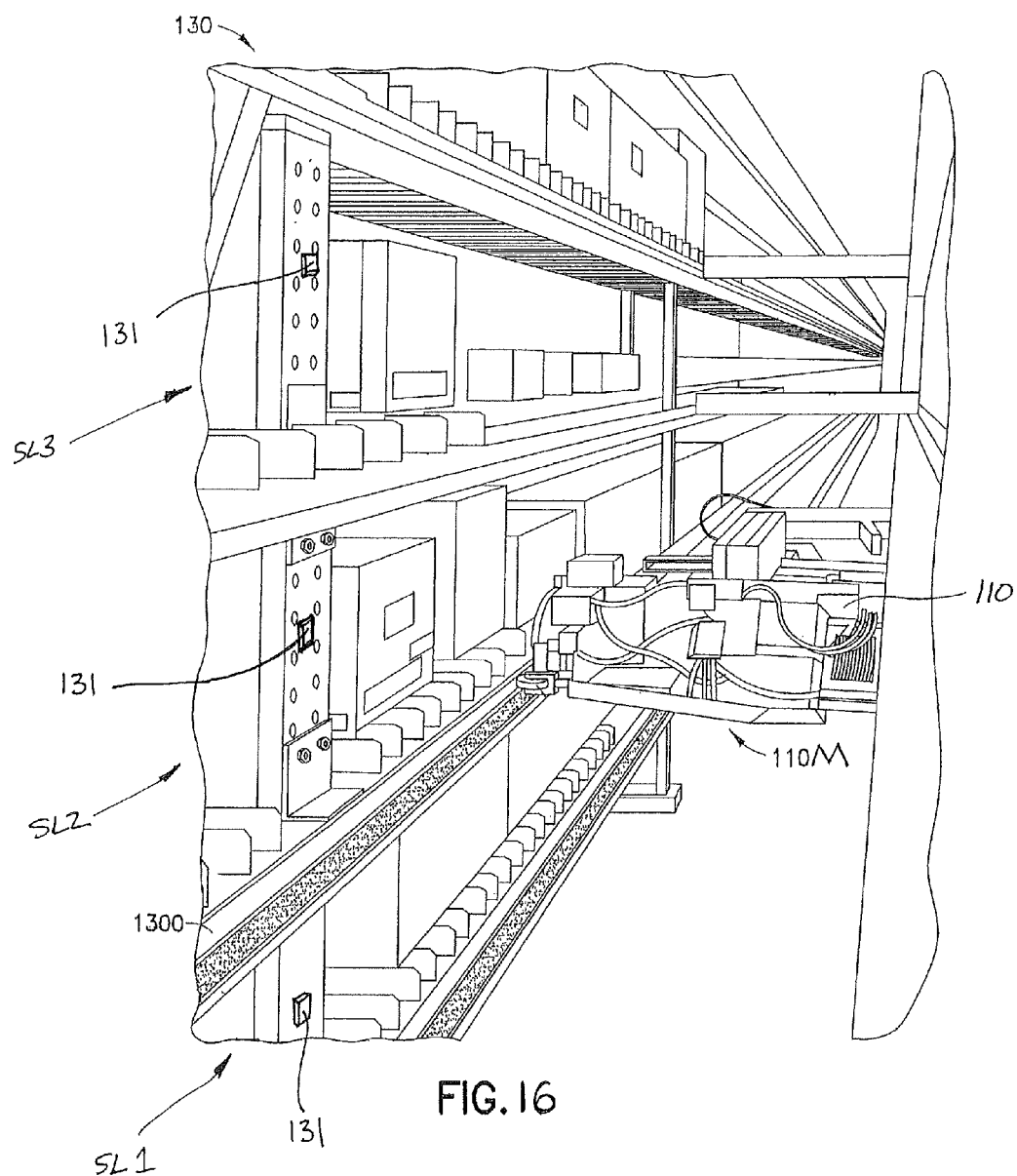
FIG. 16 illustrates a portion of a storage and retrieval system in accordance with aspects of the disclosed embodiment.

As noted previously, the storage and retrieval system includes a disturbance identification and restorative system 107 (FIG. 1) that includes a disturbance control module 107DCM (which may be the control server 120, or be incorporated in the control server 120 while in other aspects the disturbance control module may be incorporated in one or more of the control server 120 and bot controller 1220 or the disturbance control module may be separate from but in communication with the control server 120 and/or the bot controller 1220), a case mapper 110M for mapping the storage space, for example, along the rack aisles 130A, a case position restorative system 107CRS (which may be one or more of the bots 110 and the respective case detections sensor of the bot(s)) and a sensor system that includes one or more disturbance sensors (such as sensors 131—FIGS. 1, 11 and 16). For exemplary purposes the disturbance control module 107 DCM will be described as being incorporated in the control server 120. Though in other aspects the disturbance control module 107 DCM may reside remotely from the control server 120 and/or bot controller 1220 and be linked or in communication with one or more of the control server 120 and bot controller 1220 through any suitable network interface 107 NI (FIG. 1).

Figure 17:
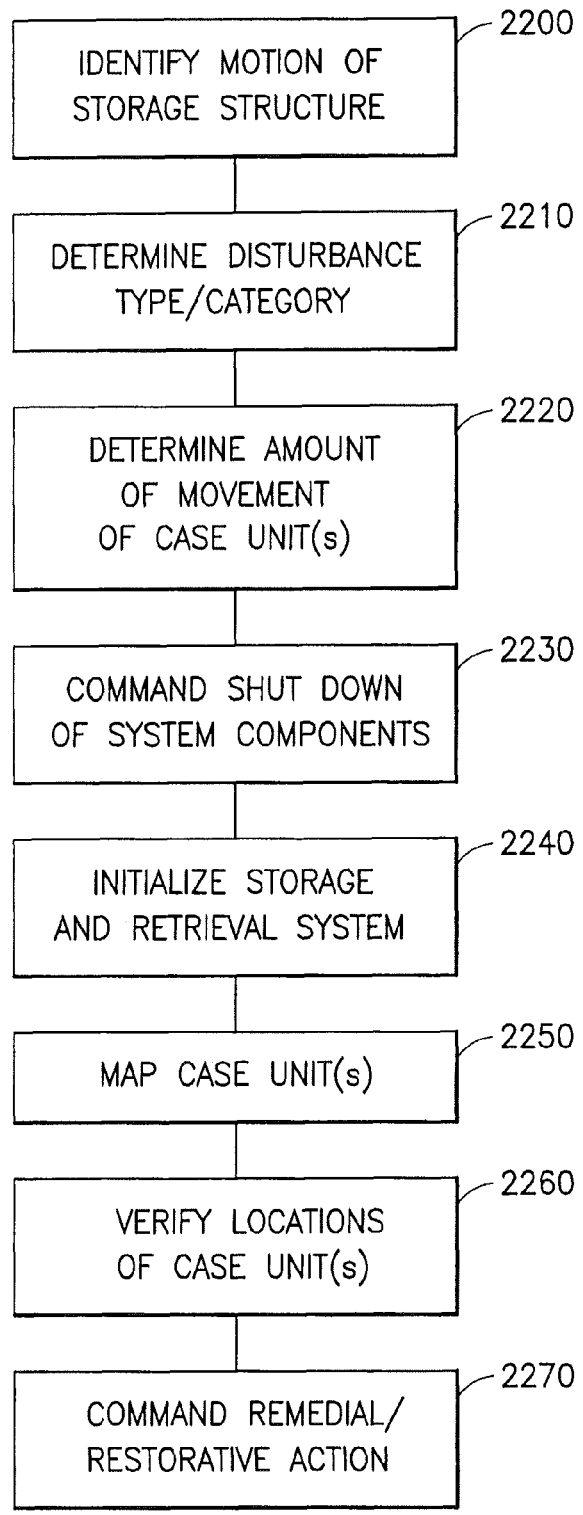
FIG. 17 is a flow chart of an exemplary method in accordance with an aspect of the disclosed embodiment.

The control server 120 may be configured (e.g. include any suitable programming or structure to perform the restorative tasks described herein) to identify a disturbance and restore the case units to a suitable position/orientation including a pre-disturbance position for automated retrieval in accordance with the ordinary warehouse management system 2500 and control server 120 protocol (see FIG. 1). For example, the control server 120 (e.g. the disturbance control module 107DCM) may include any suitable models representative of dynamic (motion) response to positional disturbances, such as those described above, that may include suitable tables or suitable algorithms, that model the response (e.g. displacement, velocities, accelerations, etc.) of the storage rack seating surface and other support structure (e.g. storage racks, picking aisles, transfer decks, multilevel vertical conveyor, etc.) during a disturbance. The control server 120 may communicate in any suitable manner with, for example, any suitable disturbance sensors 131 (e.g. accelerometers and/or other motion sensors) to identify motion of the storage structure (FIG. 17, Block 2200). For example, the communication between the disturbance sensors 131 and the control server 120 may allow the control server 120 to identify a magnitude, direction and/or location (e.g. one or more regions of the storage structure affected by the disturbance) of a disturbance within the storage and retrieval system. The control server 120 is configured, based on the movement models and information from the disturbance sensors 131, to identify or otherwise determine the scope or extent of motion at desired portions of, for example, the storage rack structure. The control server 120 may also be configured to determine a disturbance type or category (e.g. localized event, bot collision, seismic event, etc.) based on the movement models and information from the disturbance sensors 131 (FIG. 17, Block 2210). Subsequently the control server 120 may determine or otherwise estimate an amount of movement (e.g. a predicted variance) of each case unit within a storage location in the desired portion(s) of the storage rack structure (FIG. 17, Block 2220).

Upon detection of a disturbance the control server 120 may be configured to command a shutdown of bots 110, multilevel vertical conveyors and/or other active components of the storage and retrieval system 100 in the affected region (FIG. 17, Block 2230). If the disturbance is determined to be a seismic disturbance (e.g. such as an earthquake) the control server 120 may be configured to command a shutdown of all automation within the storage and retrieval system. After the disturbance subsides the control server 120 may be configured to initialize the storage and retrieval system 100 in any suitable manner (FIG. 17, Block 2240). In one aspect, initialization of the storage and retrieval system 100 may be automatic while in another aspect initialization may include manual or operator input. It is noted that bot 110 initialization may include bot location determination (e.g. using sensors on the bot as described herein) relative to the storage spaces of the storage racks (e.g. in a storage rack space reference frame). In one aspect the control server 120 may be configured to monitor the magnitude of the disturbance in different areas, such as areas DR1, DR2, DR3, DR4 (FIGS. 9-11), of the storage and retrieval system such that areas in which the disturbance is below a predetermined threshold may be returned to normal operation (e.g. fulfilling orders or replenishing the storage racks) while areas in which the disturbance is above the predetermined threshold may be designated for restorative action. It is noted that there may be any suitable number of monitored areas that may be established in any suitable manner. For example, the monitored areas may correspond to one or more storage levels SL1, SL2, SL3, portions of one or more storage levels or any suitable geographic (e.g. horizontal and/or vertical) grouping of storage structure components.

Referring again to FIG. 13A, the case mapper 110A (FIGS. 11 and 16) may be any apparatus capable of mapping the presence or absence of case units within the storage space. As will be described below, the case mapper 110M shown in FIG. 16 may be incorporated into the bot 110. The bot 110, incorporating the case mapper 110M, is shown as being unloaded but in other aspects the bot 110 may be loaded (e.g. transporting one or more case units). In one aspect, a loaded bot 110 may map case units while moving to transfer its load to a multilevel vertical conveyor 150. The mapper 110M incorporated into the bot 110, enables a bot commanded to pick loads to perform mapping when proceeding to pick/place destinations. The case mapper 110M may include a case scanning system having case sensors, such as one or more of the bot sensors described above, and a controller such as control server 120 (and/or bot controller 1220) that compares predetermined storage locations of case units and/or pickfaces with actual locations of the case units and/or pickfaces as will be described below. In other aspects, the case mapper 110M may be capable of mapping a location of any suitable features of the storage structure or any objects located therein. The case scanning system may be configured to update a storage and retrieval system database with the actual location of the case unit(s)/pickface(s) where a variance of the unit(s)/pickface(s) is below, for example, a predetermined threshold such that the case unit(s)/pickface(s) do not require handling/repositioning. Missing cases may be identified and marked for any suitable restorative action (e.g. such as notifying an operator of the storage and retrieval system and/or automated aisle scanning for missing cases).

In one aspect, as noted above, the case mapper 110M may be one or more of the bots 110 traversing the storage structure that can continuously or on demand scan the locations of the case units in the storage structure (either opportunistically as the bot happens to travel through an area affected by the disturbance during the course of normal operation or deliberately such as with a command for the case mapper/bot to scan a predetermined area of the storage racks). In still other aspects the case mapper may be included on a dedicated case mapper device or mapping bot. In one aspect, the case mapper (s) may be in communication with the control server 120 where the control server 120 queues one or more case mappers for mapping locations of the storage and retrieval system 100 based on predetermined criteria such as a predicted variance of case units/pickfaces, a magnitude of the disturbance in different areas of the storage and retrieval system (e.g. based on a predetermined disturbance magnitude threshold) and areas in which pickfaces having multiple case units are stored (FIG. 17, Block 2250). It is noted that the control server 120 may command multiple case mappers to substantially simultaneously map parallel/adjacent picking aisles and/or command multiple case mappers to map a common picking aisle (e.g. more than one case mapper is in a picking aisle at one time).

Figure 13G:
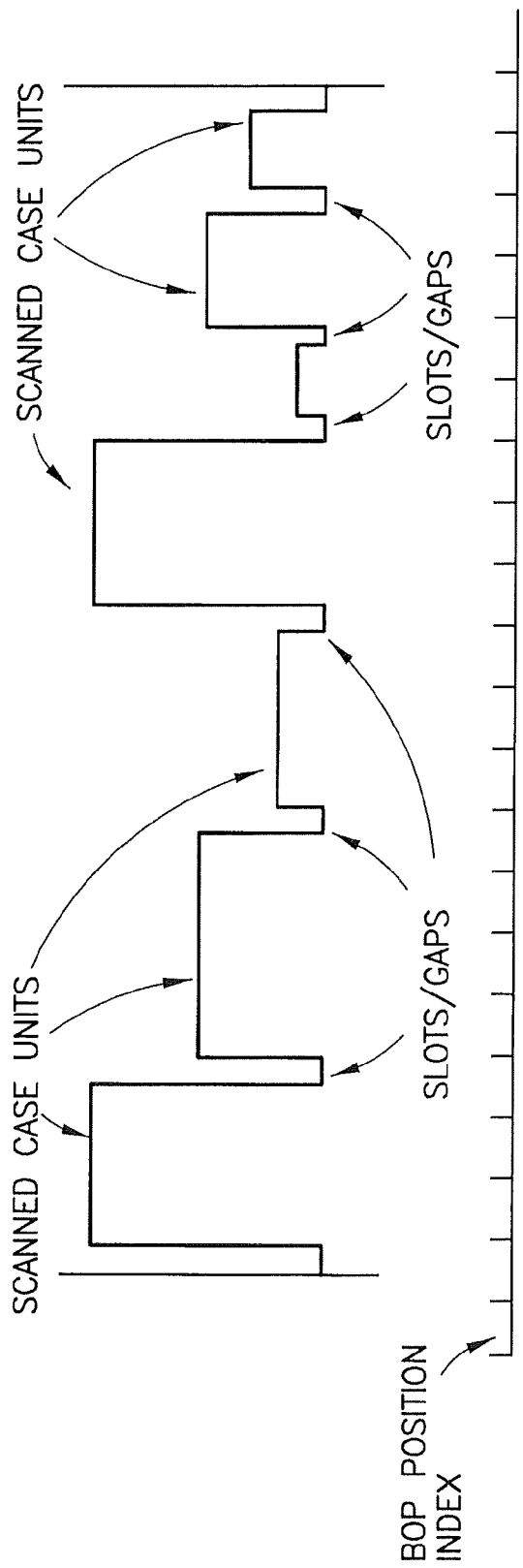
FIG. 13G is a schematic illustration of a case map in accordance with an aspect of the disclosed embodiment.

In an aspect of the disclosed embodiment, the case mapper may include any suitable number or type of case sensor (e.g. optical sensors, lasers, camera, or sensors, such as for example, the case sensors 17701, 17700, 1717, 1715, 1716) for mapping the locations and/or orientations of the case units and the pickfaces formed by the case units. The case sensors may allow, for example, a bot 110 to map case units (including their respective sizes, positions, orientations, spacing between the case units, etc.) stored within a rack aisle 130A and any case units located within a path of the bot as the bot 110 moves along the rack aisle 130A. In an aspect of the disclosed embodiment, the case sensors may be configured to generate a map of the rack aisle (or of at least a portion thereof) of case(s) (which may be one or more) seated on a shelf of the given rack aisle (see FIG. 13G which graphically illustrates a profile, though the map may be embodied in any suitable format, including tabular form, bit map, etc.) as the bot 110 moves up and down the rack space using the various sensors of the bot and in the manners described above with respect to case unit scanning and bot location determination. The rack aisle or case unit map may be generated, in one embodiment, coincident with a bot traversing a rack aisle 130A to pick or place case payloads. In other aspects, the rack aisle map may be generated at any time, whenever a rack aisle map may be desired by the system such as, for example, after a seismic event occurs. Referring now to FIG. 13G, the rack aisle map may contain a profile of the case units and slots or spaces and their respective arrangement within a given rack aisle. Any suitable controller, such as control server 120 (FIG. 1) or the bot controller 1220 (which may access a map of the storage system through any suitable memory of the storage and retrieval system) may, as described above, include a map of the storage system including the predetermined storage locations/positions and/or orientations of each case unit within the storage system. The case map (including a measured seated position of at least one case unit) generated by the bot 110 or dedicated case mapper may be compared in any suitable manner with the map (including a predetermined storage position corresponding to the at least one case unit before the disturbance) stored in, e.g., the control server 120 for determining a location of the bot 110 (or dedicated case mapper) as well as for verifying the locations and orientations of the case units within the storage structure affected by the disturbance (FIG. 17, Block 2260). As may be realized, the control server 120 may be configured to determine (e.g. using the movement models and/or disturbance sensor data) a maximum displacement or range of displacement for identifying a predicted variance between a predicted seated position (e.g. the position after the disturbance as determined by the movement models and disturbance sensor data) and the predetermined position of the at least one case unit and generate a command with information for case unit position correction based on a variance type (which will be described below). It is noted that the variance may be determined for individual case units, for pickfaces and/or for individual cases within a pickface. As may also be realized, the control server 120 may also be configured to identify (e.g. based on the models and sensor data) where restorative action may begin. For example, the control server 120 may include criteria for establishing a sequence of restorative action where, for example, areas least impacted by the disturbance are restored before areas that are affected to a greater extent by the disturbance or vice versa. In other aspects, the areas affected by the disturbance may be prioritized for restorative action in any suitable sequence or manner.

As may be realized and as noted above, any other suitable bot location methods (such as those described above) may be used in conjunction with the case scanning to generate the case unit map. It is noted that, in one aspect, the case unit map of the storage structure is continually updated by, for example, the control server 120 as cases are inducted or removed from the storage and retrieval system. In another aspect the case unit map may be updated by the control server using information provided by the bot 110 as the bot 110 scans the case units as the bot travels through the storage and retrieval system. In other aspects the case unit map may be generated in any suitable manner.

As noted above, after a disturbance, such as a seismic or other event that causes movement of the storage structure, the control server 120 may initialize mapping of the case units within the storage structure (as described above) to identify or otherwise determine measured variances (e.g. the variance, as determined by the control server 120, based on mapper data from the case mapper and the predetermined locations of the case units/pickfaces) between measured seated positions and the predetermined positions of case units/pickfaces where the variances include case units that are located within a travel path of the bots 110 (i.e. substantially obstructing a picking aisle or transfer deck or other area in which the bots travel), case units that substantially have not moved on the storage racks and are still useable by the bots 110, case units that have moved or shifted on the storage racks but are in a known state and are useable by the bot, and case units that have moved to an unknown state or moved from a predetermined location or the orientation of the case unit has moved from a predetermined orientation of the case unit such that the case unit is unusable by the bot. It is noted that, as will be described below, cases that are out of their predetermined storage location by a predetermined amount can be picked from the storage shelf, re-justified/repositioned on the storage shelf, picked and re-placed in a predetermined location or removed from the storage racks. It is also noted that the control server 120 may be configured to compare the measured variance with the predicted variance for updating the movement models to increase the accuracy of subsequently determined predicted variances.

The control server 120 may be configured to command the storage and retrieval system to take remedial or otherwise restorative action in response to the results of the case unit mapping (FIG. 17, Block 2270). The remedial or otherwise restorative action taken by the storage and retrieval system in response to the results of the case unit mapping depends on, for example, the disposition of case units (e.g. the variance type). For example, in the instance where a case unit is located within a travel path of the bots 110, a controller, such as control server 120 or bot controller 1220, may be configured to convey the location of the block travel path to an operator of the storage and retrieval system so that the case unit may be manually removed from the travel path in any suitable manner by the operator. In other aspects the storage and retrieval system may include bots configured to pick up case units from the travel paths and transport the case units to, for example, an outbound multilevel vertical conveyor for transport out of the storage and retrieval system.

Where a case unit has substantially not moved within the storage structure the bot 110 may be configured and instructed, by any suitable controller such as control server 120 or bot controller 1220, to pick the case unit from the storage location and reposition the case unit (using for example the alignment capabilities of the bot payload area as described above, e.g. the pusher, fence, etc.) in the same storage location on the storage shelf. In another aspect the bot may pick the case unit from the storage location and transport the case unit to a new storage location. It is noted that where the case unit is moved to a new storage location the position of the case unit may be dynamically updated in a database of, for example, the control server 120 (e.g. a master stored map of the case unit locations) that identifies the location of each case unit in the storage and retrieval system.

Where the case units have moved on the storage racks but are in a known state and are useable by the bot any suitable controller may be configured to dynamically update the master stored map to reflect new or subsequent positions of any case units that have moved. Here the case units may have moved from a respective predetermined position on the storage shelf to a new or subsequent position that is different than the predetermined position due to, for example, the effects of the seismic or other event on the case units. Here the bot 110 or a dedicated case mapper may scan the case units as described above and convey information pertaining to the mapped case units to any suitable controller, such as control server 120. The controller 120 may be configured to dynamically update the master stored map of the case unit locations so that the new or subsequent positions (e.g. the positions the case units moved to as a result of the seismic or other event) of the respective cases replace the predetermined positions in the stored case unit map so that the storage and retrieval system operates based on the subsequent positions of any case units that moved. As may be realized, the bot 110 may pick the case unit from the new or subsequent storage location and reposition the case unit (using for example the alignment capabilities of the bot payload area as described above, e.g. the pusher, fence, etc.) in the same new or subsequent storage location on the storage shelf.

Where the case units have moved to an unknown state or are unusable by the bot, the bot 110 may be configured to execute a "gross" pick by grabbing everything it can off of the storage rack at a particular location and transport the case units picked with the "gross" pick action to an outbound multilevel vertical conveyor for transport out of the storage and retrieval system. The cases removed with the "gross" pick action can be determined by, for example, scanning the remaining cases on the storage rack and comparing those mapped cases to the map stored in the control server 120 so that the locations of the case units in the storage and retrieval system can be dynamically updated. In another aspect, the bot may be configured to scan, for example, a barcode or other identifying indicia on the case units removed with the "gross" picking action for identifying these cases to, for example, the control server 120 for dynamically updating the case unit map. Where the bot 110 is unable to perform a "gross" picking action any suitable controller, such as control server 120 or bot controller 1220, may be configured to convey a location of the case units in need of repositioning to an operator of the storage and retrieval system so that the operator can reposition the case units as needed within the storage structure. As may be realized, after repositioning of the case unit(s) the bot 110 may scan the case units adjusted by the operator record the SKU and/or barcode of each pickface or case unit as well as the case position (based on, e.g., encoder readings or other position identifying sensors of the bot) for updating the case unit database of, for example, the control server. It is noted that a manually operated bar code reader may be used in tandem with the scanning abilities of the bot 110 to, for example, simultaneously record the SKU and/or barcode of each pickface or case unit as well as the case position for updating the case unit database. It is noted that positioning the bar code and other case unit identifying indicia in a consistent location on each case unit may allow the updating of the inventory (e.g. case unit) database to be fully automated (e.g. substantially without manual intervention).

As may be realized there may be instances where one or more of the conditions (e.g. variance types) described above exist after a seismic or other event that may cause movement of the case units in the storage and retrieval system. It should be noted that any suitable combination of remedial actions described above may be employed to update the case unit database and/or rearrange the case units in the storage and retrieval system in any suitable manner.

As may be realized, the storage and retrieval system may include disturbance sensors 131 (FIG. 1) such as accelerometers or other motion detecting devices that are configured to detect seismic events and/or other motion of the storage structure that may cause movement of the case units within the storage structure. Any suitable controller, such as control server 120 and or bot controller 1220, may be configured to receive signals from these disturbance sensors 131 and upon receipt of the signals instruct one or more bots 110 (or a dedicated scanning bot) to perform a mapping of the storage structure so that any case units that may have been moved from their predetermined position and/or orientation can either be removed from the storage and retrieval system or repositioned within the storage and retrieval system in the manner described above. As may be realized, the instructions to the one or more bots may be issued after a predetermined amount of time after the signals from the accelerometers is received so that mapping does not occur during the seismic event. In other aspects, the mapping of the storage structure after a seismic event or other movement of the storage structure may be initiated in any suitable manner. It is noted that the case units removed from the storage and retrieval system may be re-inducted into the system as, for example, new inventory items in any suitable manner.

The structure, such as structure 130, of the storage and retrieval systems described herein may be configured to sustain predetermined loads placed on the structure by normal service and events such as, for exemplary purposes only, earthquakes as defined by local and federal codes. As an example, these loads may include the dead weight of the structure, inventory stored in and transferred throughout the structure, the bots 110, seismic loads, thermal expansion and sufficient stiffness for bot control and positioning. The structure of the storage and retrieval systems 100 may also be configured for ease of assembly, maintenance access, modularity and efficient and economical material use. Non-limiting examples, of the codes to which the structure may be configured to comply include ASCE7, AISC Manual of Steel Construction, AISC Code of Standard Practice for Steel Buildings and Bridges, RMI (Rack Manufacturers Institute) and Materials Handling Industry of America. The structural components (e.g. vertical/horizontal supports, floors, etc.) of the storage and retrieval systems described herein may also include wear and/or corrosion resistant coatings including surface treatments such as, for example, paints and galvanization. In one example, the coating may include a base coating and a contrasting top coating such that any wearing of the top coating will be readily visible. In alternate embodiments the coatings and surface treatments may have any suitable configurations and colors so that wear is easily identifiable.

The storage structure 130 may be configured to be rapidly assembled and installed in the field in a "bottom up construction" (e.g. each level is constructed sequentially such that lower levels in the sequence are substantially completed before the upper levels in the sequence). For example, the vertical supports 612 and/or horizontal supports 610, 611, 613 (and/or any other components of the storage structure 130) may be predrilled, punched or otherwise preformed with assembly holes. Base plates for supporting each of the vertical supports 612 and for securing the vertical supports 612 to a floor may be preinstalled on the respective vertical supports 612. Templates may be provided for locating anchor bolts in the floor for securing the base plates. The vertical supports 612 may be configured with brackets for receiving and at least partially securing the horizontal supports 610, 611, 613. Preformed holes in the horizontal supports may also be used to, for example, bolt or otherwise fasten the horizontal supports to the vertical supports. The shelves 600 may be field assembled from prefinished components and affixed to, for example, the horizontal supports 610, 611, 613 in any suitable manner. Separate braces such as ties may be also provided for securing the horizontal supports 610, 611, 613. The transfer decks 130B may be installed in a manner substantially similar to that described above. The floors and decking of the storage structure 130 may be affixed to the horizontal supports in any suitable manner, such as for example through fasteners. The floors and decking may be preformed with installation holes to allow for securing the floors and decking to the horizontal supports. The tracking 1300 (FIG. 11) for the bots 110 may be preinstalled on or within the aisle flooring or installed in the field using for example, preformed holes or other installation guides such as templates. It is noted that in alternate embodiments, the storage structure 130 may be constructed and assembled in any suitable manner.

In accordance with one or more aspects of the disclosed embodiment an automated storage and retrieval system is provided. The storage and retrieval system includes a storage structure with storage racks configured to support case units, a controller and a picking aisle configured to provide access to the case units within the storage structure. Each case unit has a predetermined storage position in which the case unit is seated on the storage racks where the predetermined storage position is determined by the controller. An automated case mapper is configured to traverse the picking aisle and is configured to identify a seated position of at least one case unit within the storage structure. The controller is configured to compare the identified seated position of the at least one case unit received from the case mapper with the predetermined position of the at least one case unit and identify a variance between the identified seated position and the predetermined position of the at least one case unit and generate a command with information for case unit position correction based on a variance type.

In accordance with one or more aspects of the disclosed embodiment, where the controller is configured to dynamically allocate the predetermined position of each case unit within the storage structure.

In accordance with one or more aspects of the disclosed embodiment, the controller is configured to effect correction of a position of one more case units by dynamically updating the predetermined position of the one or more case units with a respective identified seated position of each case unit.

In accordance with one or more aspects of the disclosed embodiment, the case mapper comprises an autonomous transport vehicle configured to pick and place case units at storage locations within the storage structure.

In accordance with one or more aspects of the disclosed embodiment, the controller is configured to effect correction of a position of one or more case units by providing the location of the one or more case units to an operator of the storage and retrieval system for manual removal or repositioning of the one or more case units.

In accordance with one or more aspects of the disclosed embodiment, wherein the storage and retrieval system further includes an autonomous transport vehicle and the controller is configured to effect correction of a position of one or more case units by commanding the autonomous transport vehicle to pick and reposition the one or more case units at their respective storage locations or move the one or more case units to a different storage location. In a further aspect the controller is configured to dynamically update a case position database where the one or more case units are moved to a different storage location.

In accordance with one or more aspects of the disclosed embodiment, wherein the storage and retrieval system further includes an autonomous transport vehicle and the controller is configured to effect correction of a position of one or more case units by commanding the autonomous transport vehicle to perform a gross pick operation for picking one or more case units from the storage structure for transport out of the storage structure.

In accordance with one or more aspects of the disclosed embodiment, the storage and retrieval system further includes at least one movement detection device disposed in the storage structure and configured to detect movement of a respective portion of the storage structure and the controller is further configured to receive movement detection signals from the movement detection device and issue a command to the case mapper to identify a position of the case units within the storage structure.

In accordance with one or more aspects of the disclosed embodiment a method is provided. The method includes providing an automated storage and retrieval system with a storage structure with storage racks configured to support case units, a controller, where each case unit has a predetermined storage position in which the case unit is seated on the storage racks and the controller is configured to determine the predetermined storage position, a picking aisle configured to provide access to the case units within the storage structure, and an automated case mapper configured to traverse the picking aisle, the automated case mapper being configured to identify a seated position of at least one case unit within the storage structure. The method also includes comparing, with the controller, the identified seated position of the at least one case unit received from the case mapper with the predetermined position of the at least one case unit and identify a variance between the identified seated position and the predetermined position of the at least one case unit, and generating, with the controller, a command with information for case unit position correction based on a variance type.

In accordance with one or more aspects of the disclosed embodiment, the method includes dynamically allocating, with the controller, the predetermined position of each case unit within the storage structure.

In accordance with one or more aspects of the disclosed embodiment, the method includes effecting, with the controller, correction of a position of the at least one case unit by dynamically updating the predetermined position of the at least one case unit with a respective identified seated position of each case unit.

In accordance with one or more aspects of the disclosed embodiment, the case mapper comprises an autonomous transport vehicle configured to pick and place case units at storage locations within the storage structure.

In accordance with one or more aspects of the disclosed embodiment, the method includes effecting, with the controller, correction of a position of the at least one case unit by providing the location of the at least one case unit to an operator of the storage and retrieval system for manual removal or repositioning of the at least one case unit.

In accordance with one or more aspects of the disclosed embodiment, the method includes providing an autonomous transport vehicle, and effecting, with the controller correction of a position of the at least one case unit by commanding the autonomous transport vehicle to pick and reposition the at least one case unit at a respective storage location or move the at least one case unit to a respective different storage location.

In accordance with one or more aspects of the disclosed embodiment, the method includes dynamically updating, with the controller, a case position database where the at least one case unit is moved to a respective different storage location.

In accordance with one or more aspects of the disclosed embodiment, the method includes providing an autonomous transport vehicle, and effecting, with the controller, correction of a position of the at least one case unit by commanding the autonomous transport vehicle to perform a gross pick operation for picking the at least one case unit from the storage structure for transport out of the storage structure.

In accordance with one or more aspects of the disclosed embodiment, the method includes providing at least one movement detection device disposed in the storage structure and configured to detect movement of a respective portion of the storage structure, and receiving, with the controller, movement detection signals from the movement detection device and issuing a command to the case mapper to identify a position of the case units within the storage structure.

In accordance with one or more aspects of the disclosed embodiment an automated storage and retrieval system for cases in a case storage room is provided. The automated storage and retrieval system includes a storage structure with storage racks, the storage racks having a seating surface configured to support case units where a position of each case unit is non-deterministic for each storage location on the storage racks; a controller, where each case unit has a predetermined storage position in which the case unit is seated on the storage racks and the controller is configured to determine the predetermined storage position; a picking aisle configured to provide access to the case units within the storage structure; and a seismic disturbance restorative system including seismic disturbance motions sensors disposed on the storage racks, a seismic disturbance control module in communication with the seismic disturbance sensors and configured to identify a seismic disturbance, and an automated case mapper configured to traverse the picking aisle, the automated case mapper being in communication with and initialized by the seismic disturbance control module to identify a seated position of at least one case unit within the storage structure.

In accordance with one or more aspects of the disclosed embodiment, the seismic disturbance control module is further configured to compare the identified seated position of the at least one case unit received from the case mapper with the predetermined position of the at least one case unit and identify a variance between the identified seated position and the predetermined position of the at least one case unit, and generate a command with information for case unit position correction based on a variance type.

In accordance with one or more aspects of the disclosed embodiment, the case units are positioned in the storage racks in a close packed spacing.

It should be understood that the exemplary embodiments described herein may be used individually or in any suitable combination thereof. It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. An automated storage and retrieval system for cases in a case storage room, the automated storage and retrieval system comprising:

a storage structure with storage racks configured to support case units;

a controller, where each case unit has a predetermined storage position in which the case unit is seated on the storage racks and the controller is configured to determine the predetermined storage position;

a picking aisle configured to provide access to the case units within the storage structure; and an automated case mapper configured to traverse the picking aisle, the automated case mapper being configured to identify a seated position of at least one case unit within the storage structure;

wherein the controller is further configured to compare the identified seated position of the at least one case unit received from the case mapper with the predetermined position of the at least one case unit and identify a variance between the identified seated position and the predetermined position of the at least one case unit, and generate a command with information for case unit position correction based on a variance type.

2. The automated storage and retrieval system of claim 1, where the controller is further configured to dynamically allocate the predetermined position of each case unit within the storage structure.

3. The automated storage and retrieval system of claim 1, where the controller is further configured to effect correction of a position of the at least one case unit by dynamically updating the predetermined position of the at least one case unit with a respective identified seated position of each case unit.

4. The automated storage and retrieval system of claim 1, where the case mapper comprises an autonomous transport vehicle configured to pick and place case units at storage locations within the storage structure.

5. The automated storage and retrieval system of claim 1, where the controller is further configured to effect correction of a position of the at least one case unit by providing the location of the at least one case unit to an operator of the storage and retrieval system for manual removal or repositioning of the at least one case unit.

6. The automated storage and retrieval system of claim 1, further comprising an autonomous transport vehicle and the controller is further configured to effect correction of a position of the at least one case unit by commanding the autonomous transport vehicle to pick and reposition the at least one case unit at a respective storage location or move the at least one case unit to a respective different storage location.

7. The automated storage and retrieval system of claim 6, where the controller is configured to dynamically update a case position database where the at least one case unit is moved to a respective different storage location.

8. The automated storage and retrieval system of claim 1, further comprising an autonomous transport vehicle and the controller is configured to effect correction of a position of the at least one case unit by commanding the autonomous transport vehicle to perform a gross pick operation for picking the at least one case unit from the storage structure for transport out of the storage structure.

9. The automated storage and retrieval system of claim 1, further comprising at least one movement detection device disposed in the storage structure and configured to detect movement of a respective portion of the storage structure and the controller is further configured to receive movement detection signals from the movement detection device and issue a command to the case mapper to identify a position of the case units within the storage structure.

10. A method comprising:
  providing an automated storage and retrieval system with
    a storage structure with storage racks configured to support case units,
    a controller, where each case unit has a predetermined storage position in which the case unit is seated on the storage racks and the controller is configured to determine the predetermined storage position,
    a picking aisle configured to provide access to the case units within the storage structure, and
    an automated case mapper configured to traverse the picking aisle, the automated case mapper being configured to identify a seated position of at least one case unit within the storage structure;
  comparing, with the controller, the identified seated position of the at least one case unit received from the case mapper with the predetermined position of the at least one case unit and identify a variance between the identified seated position and the predetermined position of the at least one case unit; and
  generating, with the controller, a command with information for case unit position correction based on a variance type.

11. The method of claim 10, further comprising dynamically allocating, with the controller, the predetermined position of each case unit within the storage structure.

12. The method of claim 10, further comprising effecting, with the controller, correction of a position of the at least one case unit by dynamically updating the predetermined position of the at least one case unit with a respective identified seated position of each case unit.

13. The method of claim 10, where the case mapper comprises an autonomous transport vehicle configured to pick and place case units at storage locations within the storage structure.

14. The method of claim 10, further comprising effecting, with the controller, correction of a position of the at least one case unit by providing the location of the at least one case unit to an operator of the storage and retrieval system for manual removal or repositioning of the at least one case unit.

15. The method of claim 10, further comprising:
  providing an autonomous transport vehicle; and
  effecting, with the controller correction of a position of the at least one case unit by commanding the autonomous transport vehicle to pick and reposition the at least one case unit at a respective storage location or move the at least one case unit to a respective different storage location.

16. The method of claim 15, further comprising dynamically updating, with the controller, a case position database where the at least one case unit is moved to a respective different storage location.

17. The method of claim 10, further comprising:
  providing an autonomous transport vehicle; and
  effecting, with the controller, correction of a position of the at least one case unit by commanding the autonomous transport vehicle to perform a gross pick operation for picking the at least one case unit from the storage structure for transport out of the storage structure.

18. The method of claim 10, further comprising:
  providing at least one movement detection device disposed in the storage structure and configured to detect movement of a respective portion of the storage structure; and
  receiving, with the controller, movement detection signals from the movement detection device and issuing a command to the case mapper to identify a position of the case units within the storage structure.

19. An automated storage and retrieval system for cases in a case storage room, the automated storage and retrieval system comprising:
  a storage structure with storage racks, the storage racks having a seating surface configured to support case units where a position of each case unit is non-deterministic for each storage location on the storage racks;
  a controller, where each case unit has a predetermined storage position in which the case unit is seated on the storage racks and the controller is configured to determine the predetermined storage position;
  a picking aisle configured to provide access to the case units within the storage structure; and
  a seismic disturbance restorative system including
    seismic disturbance motions sensors disposed on the storage racks,
    a seismic disturbance control module in communication with the seismic disturbance sensors and configured to identify a seismic disturbance, and an automated case mapper configured to traverse the picking aisle, the automated case mapper being in communication with and initialized by the seismic disturbance control module to identify a seated position of at least one case unit within the storage structure.

20. The automated storage and retrieval system of claim 19, wherein the seismic disturbance control module is further configured to compare the identified seated position of the at least one case unit received from the case mapper with the predetermined position of the at least one case unit and identify a variance between the identified seated position and the predetermined position of the at least one case unit, and generate a command with information for case unit position correction based on a variance type.

21. The automated storage and retrieval system of claim 19, wherein the case units are positioned in the storage racks in a close packed spacing.

* * * * *